(12) United States Patent  
Margulies et al.

(10) Patent No.: US 9,118,763 B1
(45) Date of Patent: Aug. 25, 2015

(54) REAL TIME FEEDBACK PROXY

(71) Applicant: Five9, Inc., San Ramon, CA (US)

(72) Inventors: Edwin Kenneth Margulies, Van Alstyne, TX (US); Ran Ezerzer, Alamo, CA (US); Moni Manor, Mountain View, CA (US)

(73) Assignee: Five9, Inc., San Ramon, CA (US)

(*) Notice: Subject to any disclaimer, the term of this patent is extended or adjusted under 35 U.S.C. 154(b) by 0 days.

(21) Appl. No.: 14/564,540

(22) Filed: Dec. 9, 2014

(51) Int. Cl.
*H04M 3/00* (2006.01)
*H04M 3/51* (2006.01)

(52) U.S. Cl.
CPC .................................... *H04M 3/5191* (2013.01)

(58) Field of Classification Search
CPC . H04M 3/5175; H04M 3/523; H04M 3/5191; H04M 3/5183; H04M 3/51; H04M 3/5166
USPC ............................. 379/265.01–265.02, 265.09
See application file for complete search history.

(56) References Cited

U.S. PATENT DOCUMENTS

| | | |
|---|---|---|
| 6,337,904 B1 | 1/2002 | Gisby |
| 6,510,427 B1 | 1/2003 | Bossemeyer et al. |
| 7,577,246 B2 | 8/2009 | Idan et al. |
| 7,587,678 B1 | 9/2009 | English et al. |
| 7,877,265 B2 | 1/2011 | Pasquale et al. |
| 8,755,372 B2 | 6/2014 | Fried et al. |
| 2014/0119531 A1* | 5/2014 | Tuchman et al. ........ 379/265.09 |

* cited by examiner

*Primary Examiner* — Rasha Al Aubaidi
(74) *Attorney, Agent, or Firm* — Jones Day

(57) ABSTRACT

In accordance with the teaching described herein, systems and methods are provided for a communications proxy and overlay network for a plurality of customer feedback collection instruments that are configured to gather information from customers. A communications server array may be configured to communicate with a user device and one or more contact centers. An application server may be configured to communicate with the communications server array, a contact centers having associated user interfaces. An intelligent text processing and analysis module may be configured to transform an input from the user device to a modified input for use by the first contact center and second contact center to facilitate real time or delayed communications between users and agents.

30 Claims, 11 Drawing Sheets

REAL TIME FEEDBACK PROXY

FIELD

The technology described in this patent document relates generally to customer service, customer feedback and voice-of-the-customer infrastructure, and more particularly, to automating and aggregating actionable, rules-based actions to connect users with customer service agents in real time or to schedule mass communications on behalf of the enterprise.

BACKGROUND

It is a generally accepted practice amongst organizations with large constituencies to offer customer services to clients. These services come in the form of self-service automation systems including web sites with knowledge base articles, e-commerce interfaces, Interactive Voice Response (IVR) systems, smartphone self-service applications and mobile text messaging and email services. Companies that provide the infrastructure for these systems are well known to customer service practitioners. For example vendors of such infrastructure include: Aspect Communications, Nuance Communications and IBM to name a few.

In addition to these self-service outlets for its customers, enterprises also offer "live" connections to customer service agents and other knowledge workers in order to provide personalized access to discuss billing, order status, troubleshooting and account balance information as a few examples. These types of connections are supported by Automatic Call Distributor (ACD), and Private Branch Exchange (PBX) systems along with automated attendant systems. In general, these systems are referred to as contact center or call center infrastructure. Vendors who provide contact center infrastructure include Avaya, Cisco, and Five9, for example.

It is typical for larger organizations to use both self-service systems and contact center infrastructure together in order to provide a balance between automated and "live" services for their customers. It is common for some organizations to receive literally thousands of customer inquiries each day, and for this reason it is advantageous for self-service systems and contact center systems to be programmatically connected to other support infrastructure such as Customer Relationship Management (CRM), Help Desk, and Enterprise Resource Planning (ERP) systems. Such support infrastructure is provided by vendors such as Oracle, Salesforce.com and SAP for example.

The connections between all of these self-service, contact center, and support systems are largely customized. Tools to connect and trade data between these systems are often called Computer Telephone Integration (CTI) systems and are provided by vendors such as Genesys Labs and Engehouse, for example. There is also a significant business in systems integration and consulting to facilitate connection between these systems offered by companies such as Accenture, HP and IBM.

These same enterprises that invest heavily in self-service, contact center, and support systems also make significant investments in understanding and tracking the behavior of their users and customers. Ostensibly, a means to capture customer sentiment, customer experience, and trending behavior data yields relevant insight on the level of acceptance of both automated and live communications. Likewise, this data also indicates the overall level of acceptance of an enterprise's products or services.

Many enterprises also use sentiment and customer influence as metrics with which optimal routing and concierge-like services are provided. Take, for example, how "platinum level" customers are given preferential "live" treatment in being routed in contact center systems. The same routing priority applies to Service Level Agreement (SLA) priorities in answering social networking queries in a customer service scenario. For example, some airlines use sophisticated Social Engagement software as part of their overall customer service infrastructure to answer questions or complaints posted by customers on outlets such as Twitter and Facebook. Such systems are called "Social Engagement for Customer Care" systems. Practitioners use standard sentiment metrics in these systems to bump certain social posts higher in priority from an SLA standpoint.

Many attempts have been made to gather customer sentiment, behavior and trend information in the form of off-line surveys or other feedback mechanisms. A common practice, for example, is to "push" a survey pop-up window on a web site after a knowledge base article has been provided to a customer. Questions on such surveys include items such as: "Was this a helpful article?" or "Do you feel like you have your answer?" In addition, customized surveys are commonly used by enterprises and built on an ad-hoc basis. Vendors such as Survey Monkey and Zoho have popular products that facilitate survey instrumentation for both mobile and web-based interactions.

Another way of collecting sentiment or survey information is via automated telephone-based systems. For example, IVR systems will often have a post-call option for customers to take a survey. This is a commonly available option in most IVR systems.

With the growing popularity of social networking and Social Engagement for Customer Care, there are also methods for ascertaining customer behavior and sentiment by collecting bulk data from many customers at the same time. These methods require the use of so-called Big Data or Big Stream technology such as those provided by vendors like GNIP or DataSift, for example. These vendors aggregate social networking and news feeds and provide a curative mechanism for enterprises to filter data for their particular needs.

Other collection mechanisms for web sites include Customer Experience Analytics tools that allow enterprises to collect the electronic "breadcrumbs" of a customer journey in order to understand what parts of the web site a customer visited and what choices were made. This same analytics-based approach can be applied to IVR systems and mobile devices as well. Vendors who provide this Customer Experience Analytics and voice-of-the-customer software include IBM Smarter Commerce and ClickFox, for example.

Once this survey, sentiment, or voice-of-the-customer data is collected and analyzed, it is typically stored in a database. An enterprise will then use Business Intelligence (BI) tools to manipulate the data in order to provide reports and other insights to customer service executives. The tools to do this are commonly available from companies such as Pegasystems, IBM, and Oracle for example.

However, one of the biggest challenges that enterprises face in contemplating the data collected from surveys, sentiment trend data, customer behavior or customer experience, is that by the time some understanding of what the data means can be ascertained, the opportunity to take effective action to help the customer or sway a competitive decision has long since passed. In addition, the ability to ascertain a customer trend and act on it programmatically is not obvious. Heretofore, most survey, sentiment, behavioral, and customer experience data is not "live" nor is it used in close-to-real time for individualized or automated bulk communication.

This gap between customer feedback collection versus tangible and immediate action means there is a fundamental "disconnect" between automated or live customer service and voice-of-the-customer initiatives. That is to say that data collected from surveys, sentiment, trend, behavior and general customer experience data is not used to facilitate real time, individualized or bulk communications in a consistent or programmatic way. In addition, no overlay system that would aggregate such data and synchronize its use across disparate target contact centers or other communication channels has heretofore existed.

SUMMARY

In accordance with the teaching described herein, systems and methods are provided for a communications proxy and overlay network for a plurality of customer feedback collection instruments that are configured to gather information from customers. A communications server array may be configured to communicate with a user device and one or more contact centers. The communications server array may include a first network signaling interface configured to communicate over a first type of telecommunications network, and a second network signaling interface configured to communicate over a second type of telecommunications network. An application server may be configured to communicate with i) the communications server array, ii) a first contact center with an associated first user interface, and iii) a second contact center with an associated second user interface. The application server may be configured to store and transmit a first unique interaction ID and token for interacting with the first contact center, and a second unique interaction ID and token for interacting with the second contact center. The application server may be further configured to assemble and transmit the first unique interaction ID and token based on an input associated with the user device to generate an output for interacting with the first contact center using the first user interface. An intelligent text processing and analysis module may be configured to transform an input from the user device to a modified input for use by the first contact center and second contact center to facilitate real time or delayed communications between users and agents.

DETAILED DESCRIPTION

Figure 1:
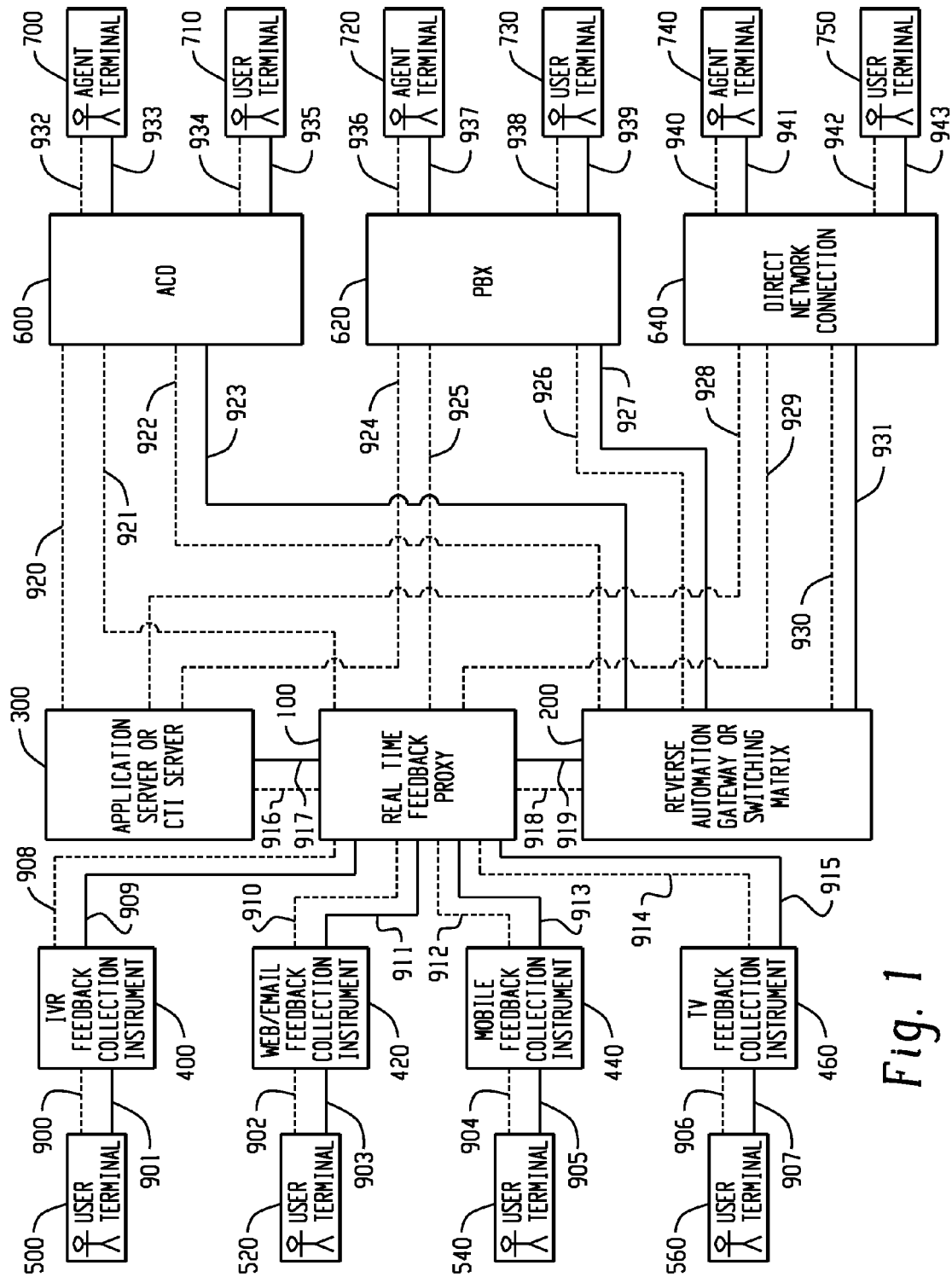
FIG. 1 is a block diagram illustrating an example of a real time feedback proxy situated in an overall customer service and contact center infrastructure environment.

FIG. 1 is a block diagram that illustrates an example of a real time feedback proxy 100 that interfaces between multiple feedback collection instruments, including an IVR feedback collection instrument 400, a web/email feedback collection instrument 420, a mobile feedback collections instrument 440, and a TV feedback collection instrument 460. These feedback collection instruments are logically connected to a communications server array, which includes four inbound and outbound communication servers 140, 145, 150, and 155.

The IVR feedback collection instrument 400 may, for example, be implemented as a standard interactive voice response system in which touch-tone digits or speech may be used as input in response to verbal scripts encountered by the user. There are both proprietary and open source tools available to build such a system. For example, the use of VXML (Voice eXtensible Markup Language) and SRGS (Speech Recognition Grammar Specification) is popular in programming IVR logic flows, including voice-of-the-customer survey dialogs. In addition, the IVR feedback collection instrument 400 may employ CCXML (Call Control eXtensible Markup Language) to pass call control or call set-up information in order to do call transfers, bridges, or other telephonic functions.

IVR languages may be used to pass call control or other information to the real time feedback proxy 100. Communications between the IVR feedback collection instrument 400 and the real time feedback proxy 100 may travel over a communications pipeline 908. Such a communication would be a software-based communication using, for example, TCP/IP (Transmission Control Protocol/Internet Protocol) or HTTP (Hypertext Transfer Protocol) or REST-based (Representational State Transfer) protocol. In another example, an IVR system may be programmed to pass collected information to the real time feedback proxy 100 using in-band touchtones over a telephonic connection 909, or SIP (Session Initiation Protocol) header messages.

In one example, the real time feedback proxy 100 will be equipped with a RESTlet server mechanism, suitable for collecting REST-based commands from an IVR system. There are various alternate ways to achieve the same result using both proprietary or open standards based APIs and other communications methods.

In certain examples, voice of the customer data, or experiential data depicting the customer journey during the IVR transaction, may be alternately transmitted in real time, as the data is collected, or stored by the IVR system and transmitted en masse at regular intervals to the real time feedback proxy 100. The use of real-time transmission of this data may facilitate a real-time connection with the customer (or many customers) to an agent during the same time frame as the original interaction itself. The use of delayed transmission of this data may facilitate a delayed connection between the customer and the agent for purposes of fulfilling a customer preference or for purposes of triggering a mass communication to more than one customer.

A user interface for the IVR feedback collection instrument 400 is depicted by user terminal 500 in FIG. 1. For telephonic communications to an IVR system, the user terminal would typically be manifest as a regular, touch-tone telephone or mobile phone. The carriage of signals from the telephone instrument can take a variety of forms including PSTN (Public Switched Telephone Network), or Cellular networks. This communication pathway is represented by reference 900. Alternately, a user terminal for IVR interaction may be a so-called "soft phone" using VoIP protocol, depicted by pathway 901 via a computer interface. For example, the well-known Microsoft service known as Skype would be considered a "soft phone" service.

The web/email feedback collection instrument 420 may, for example, be implemented as a standard Web-based form wherein simple customer-entered text is used as input in response to text-based questions encountered by the user. For an average practitioner of web site programming, it is common to construct web forms that collect feedback from the customer. There are both proprietary and open source tools available to build such a system. For example, vendors such as JotForm, Wofoo and Marketo are providers of these tools. The use of Java, JavaScript and other popular programming languages are in common use by practitioners for this purpose.

In addition, the web/email feedback collection instrument 420 may be programmed to collect email information from a corporate or personal email server using standard IMAP or POP3 protocols, for example, in order to scan the sender identification, headers and bodies of email messages. Such scanning of emails can be used to create a corpus of data representing customer sentiment and feedback. This data can then be processed by the real time feedback proxy 100 downstream in the same manner as other data collected by the web/email feedback collection instrument 420.

In another example, the web/email feedback collection instrument 420 may also be used to collect questions from the customer as opposed to solely presenting questions. Such questions posed by the customer could be, for example, questions such as: "How do I replace a bad battery on my iPhone 5?" or "What is the procedure for returning my keyboard for repair." In Tandem with the web/email feedback collection instrument 420, the inbound communications server/data collection 140 (shown in FIG. 2) may provide a search engine function to identify articles and knowledge base content suitable to answer the questions posed by the user. Such articles and knowledge base content need not be restricted to a specific enterprise database, but may also exist on the World Wide Web and in Social Networks. For example, the open source Apache Lucene/SOLR software can take text and use that text to search for, index and retrieve relevant articles.

The information gleaned from such a search may be processed by the real time feedback proxy 100 and used to formulate ranked answers that may be transmitted to an individual user or to a plurality of users in a broadcast. The triggers to take action on these outbound communications may, for example, reside in the rules engine 115 in FIG. 2.

Such collected data may be packaged and transmitted to the real time feedback proxy 100 in a variety of ways. For example, data may travel over a communications pipeline 910, as shown in FIG. 1. Such a communication would be a software-based communication using, for example TCP/IP (Transmission Control Protocol/Internet Protocol) or HTTP (Hypertext Transfer Protocol) or REST-based (Representational State Transfer) protocol. In another example, a web site program may use CCXML or other IVR-based protocols to pass information to the real time feedback proxy 100 over a connection depicted by reference 911 in FIG. 1.

In another example, a web site may be used to trigger a SIP-based (Session Initiation Protocol) or WebRTC (Web Real Time Communication) path 903 to the real time feedback proxy 100.

In one example, the real time feedback proxy 100 may be equipped with a WebRTC and/or RESTlet server mechanism, suitable for collecting WebRTC and/or REST-based commands from a web site. There are various alternate ways to achieve the same result using both proprietary or open standards based APIs and other communications methods.

Voice-of-the-customer data, or experiential data depicting the customer journey during the web-based transaction, may, for example, be alternately transmitted in real time (as the data is collected), or stored by the web application software and transmitted en masse at regular intervals to the real time feedback proxy 100. This may include "breadcrumb" information or other manifestations of customer experience analytics. The use of real-time transmission of this data may facilitate a real-time connection with the customer to an agent during the same time frame as the original interaction itself. The use of delayed transmission of this data may facilitate a delayed connection between the customer (or many customers) and the agent for purposes of fulfilling a customer preference or for purposes of triggering a mass communication to more than one customer.

A user interface for the web/email feedback collection instrument 420 is depicted by the user terminal 520 in FIG. 1. For traditional communications to a web-based system, the user terminal would typically be a computer or mobile device that navigates the web site visually using HTTP protocols. The user navigates the web site to view documents and forms created in standard HTML (Hypertext Markup Language). Here the connection between the user terminal 520 and the web/email feedback collection instrument 420 is depicted by communications pathway 902.

For telephonic communications to a web-based system, the user terminal would typically be manifest as a "soft phone" using VoIP (Voice Over IP) protocol, depicted by pathway 903 via a computer interface. For example, the well-known Microsoft service known as Skype would be considered a "soft phone" service.

The mobile feedback collection instrument 440 may, for example, be implemented as a standard mobile web-based form wherein simple customer-entered text is used in response to text-based questions encountered by the user. There are both proprietary and open source tools available to build such a system. For example, vendors such as JotForm, Wofoo and Marketo are providers of these tools. The use of Java, JavaScript and other popular programming languages are in common use by practitioners for this purpose.

In another example, the use of mobile programming languages such as ObjectiveC (used in Apple iPhones) or Java (used in Android devices) may be used to construct voice-of-the-customer feedback and sentiment collection instruments. In addition, libraries may be constructed that allow such programs to "tag" each page encountered by the user such that the use of those pages or programming features may also be transmitted in the form of customer experience analytics data. Tools to build applications such as these are available from companies such as Appcellerator and Google, for example.

Such collected data may be packaged and transmitted to the real time feedback proxy 100 in a variety of ways. For example, data may travel over a communications pipeline 912, as shown in FIG. 1. Such a communication may be a software-based communication using, for example TCP/IP (Transmission Control Protocol/Internet Protocol) or HTTP (Hypertext Transfer Protocol) or REST-based (Representational State Transfer) protocol. In another example, a mobile program may use CCXML or other IVR-based protocols to pass information to the real time feedback proxy 100 over connection 913.

In another example, a mobile application may be used to trigger a SIP-based (Session Initiation Protocol) or WebRTC (Web Real Time Communication) path 905 to the real time feedback proxy 100.

The real time feedback proxy 100 may, for example, be equipped with a WebRTC and/or RESTlet server mechanism, suitable for collecting WebRTC and/or REST-based commands from a mobile device. There are various alternate ways to achieve the same result using both proprietary or open standards based APIs and other communications methods.

Voice-of-the-customer data, or experiential data depicting the customer journey during the mobile transaction, may, for example, be alternately transmitted in real time (as the data is collected), or stored by the mobile or in-car telemetry application software and transmitted en masse at regular intervals to the real time feedback proxy. This may include "breadcrumb" information, geo-location information, or other manifestations of customer experience analytics. The use of real-time transmission of this data may facilitate a real-time connection with the customer to an agent during the same time frame as the original interaction itself. The use of delayed transmission of this data may facilitate a delayed connection between the customer (or many customers) and the agent for purposes of fulfilling a customer preference or for purposes of triggering a mass communication to more than one customer.

A user interface for the mobile feedback collection instrument 440 is depicted by user terminal 540 in FIG. 1. For traditional communications from a mobile device, the user terminal would typically be a smartphone that navigates a web site visually using HTTP protocols, or alternately navigate a smartphone application. The user navigates a mobile web site or smartphone application view documents and forms created in standard HTML (Hypertext Markup Language) or some proprietary user interface. Here the connection between the user terminal 540 and the mobile feedback collection instrument 440 is depicted by communications pathway 904. It is possible for the user terminal 540 and the mobile feedback collection instrument 440 to be "collapsed" as one instrument.

An another example, user terminal 540 may collect information from the user via voice commands. Examples of this are evidenced by the popular "Siri" personal assistant software available from Apple for its iPhones or "Google Now" for Android, or "Cortana" for Microsoft phones.

In still another example, user terminal 540 can be contemplated as an in-car telemetry system, such as those made popular by General Motors' OnStar service. Such a system is built-in to automobiles, but there are also devices available as after-market add-ons so they can be retrofitted to any automobile. These telemetry devices use commonly available transmission protocols such as CDMA (Code Division Multiple Access) and they also use global positioning data using GPS (Global Positioning Satellite).

For both traditional mobile phones and also in-car telemetry devices, telephonic communications from the user terminal would typically use native cellular phone capability. Alternately, a built-in "soft phone" using VoIP protocol, depicted by pathway 905 via a smartphone application could be used.

The TV feedback collection instrument 460 may, for example, be implemented as a fit-for-purpose application as part of a cable or satellite set-top box. Such set-top boxes are fixtures in many households. These set-top boxes are typically controlled by the user via a remote control device as depicted by user terminal 560. Practitioners of Set-Top Box application development will be familiar with popular vendors of the devices including Inview Technology, Scientific Atlanta (Cisco) and Motorola Mobility (Google). For the most part, these Set-Top Boxes are essentially programmable computers with the addition of television signaling sources. Alternately, the use of new protocols such as IPTV may be used to transmit video content and programming signals.

In another example, set-top boxes can be used as an input mechanism in response to video or text-based questions encountered by the user on his television. With the advent of Internet connections bundled with television broadcast services, the input may also manifest as web site forms that may be sued to collect feedback from the customer. There are both proprietary and open source tools available to build such a system. For example, vendors such as JotForm, Wofoo and Marketo are providers of these tools. The use of Java, JavaScript and other popular programming languages are in common use by practitioners for this purpose.

In another example, the use of standard programming languages such as Java or the C programming language may be used to construct voice-of-the-customer feedback and sentiment collection instruments for set-top boxes. In addition, libraries may be constructed that allow such programs to "tag" each channel or feature encountered by the user such that the use of those channels or programming features may also be transmitted in the form of customer experience analytics data.

Such collected data may be packaged and transmitted to the real time feedback proxy 100 in a variety of ways. For example, data may travel over a communications pipeline 914, as shown in FIG. 1. Such a communication may be a software-based communication using, for example TCP/IP (Transmission Control Protocol/Internet Protocol) or HTTP (Hypertext Transfer Protocol) or REST-based (Representational State Transfer) protocol. In another example, a mobile program may use CCXML or other IVR-based protocols to pass information to the real time feedback proxy 100 over connection 915.

In another example, a TV application may be used to trigger a SIP-based (Session Initiation Protocol) or WebRTC (Web Real Time Communication) path 906 to the real time feedback proxy 100.

The real time feedback proxy may, for example, be equipped with a WebRTC and/or RESTlet server mechanism, suitable for collecting WebRTC and/or REST-based commands from a TV Set-Top Box device. There are various alternate ways to achieve the same result using both proprietary or open standards based APIs and other communications methods.

Such voice-of-the-customer data, or experiential data depicting the customer journey during the TV transaction, may, for example, be alternately transmitted in real time, as the data is collected, or stored by the TV application software and transmitted en masse at regular intervals to the real time feedback proxy 100. This may include "breadcrumb" information, channel user information, room location, or other manifestations of customer experience analytics. The use of real-time transmission of this data may facilitate a real-time connection with the customer to an agent during the same time frame as the original interaction itself. The use of delayed transmission of this data may facilitate a delayed connection between the customer (or many customers) and the agent for purposes of fulfilling a customer preference or for purposes of triggering a mass communication to more than one customer.

A user interface for the TV feedback collection instrument 460 is depicted by user terminal 560. For traditional communications to a set-top box, the user terminal is typically a hand-held remote control device. Such devices use popular transmission protocols such as IR (infrared) or RF (radio frequency) to communication to the TV feedback collection instrument 460. The user navigates a proprietary set-top box-based/TV-based application or web-based application in order to view documents and forms created in standard HTML (Hypertext Markup Language) or some proprietary user interface. Here the connection between the user terminal 560 and the TV feedback collection instrument 460 is depicted by communications pathway 906.

An another example, user terminal 560 may collect information from the user via voice commands. Examples of this are evidenced by remote control devices manufactured by companies such as RCA and Invoca.

In addition, a built-in "soft phone" using VoIP protocol, depicted by pathway 907 via a remote control and set-top box combination may be achieved.

As shown in FIG. 1, the real time feedback proxy 100 may provide an interface between one or more application servers or CTI servers 300, and one or more reverse automation gateways or switching matrices 200.

The real time feedback proxy 100 may interface with one or more application servers 300 via communications pathway 916 and/or 917. The communication pathway 916, 917 for communicating with an application server 916 may utilize any number of standard or proprietary protocols, such as HTTP, REST, or TCP/IP. Communication pathway 917 may include a telephonic or video-based protocol used to convey voice communications or video communications using the SIP or WebRTC protocols mentioned above.

An application server 300 may include a server-side computer system with some software state control and command/reply capability. An application server 300 is often implemented as a web-based server, such as a Java platform running Java Enterprise Edition software. In another example, an application server could be implemented using the Microsoft .NET framework. Alternately, a web-based Application Server could run a PHP (Personal Home Page Tools) framework from vendors such as Techdivision GmbH or Zend Technologies.

Tools to implement communications between an application server and a third party application (such as the real time feedback proxy 100) are commonly available. For example, open source tools for REST-based communications are available via RESTlet.org. For example, open source TCP/IP-based communications tools are available from Freescale.

In operation, the real time feedback proxy 100 may send automated communications set-up scripts or case/object tokens to the application server 300, which in turn may send corresponding communication commands to an ACD 600, PBX 620 or direct network connection 640 over communication channels 920 (to the ACD), 924 (to the PBX) or 928 (for direct network connection).

The ACD 600 will typically be equipped with a standard CTI (Computer Telephone Integration) communication protocol such as CSTA (an ITU Standard), or TAPI (a Microsoft Standard), or TSAPI (an Avaya Standard). These standard communication protocols may be used to instruct the ACD on doing a call origination to an agent or to set up a conference call between an agent and a user. In this example, the application server 300 does the job of translating the automated communications set-up scripts or case/object tokens received from the real time feedback proxy 100 so that they match the particular CTI protocol of the target ACD 600. In this fashion, the real time feedback proxy 100 becomes a centralized hub from which a plurality of communications may occur amongst a plurality of ACDs 600—each having their own particular connection to ACDs 600.

A CTI server 300 may include a server-side computer system that facilitates computer-to-telephony communication. In modern implementations, the term CTI has grown to also include multi-channel uses. Commercially available CTI servers include the Cisco Peripheral Gateway or the Genesys Labs T-Server. Both are ACD or IVR or PBX-specific application servers. These CTI servers use a proprietary protocol published by their makers in order to communicate between applications and ACDs, PBXs and IVR systems, for example.

Tools to implement communications between a CTI server and a third party application (such as the real time feedback proxy 100) or with an ACD or PBX are commonly available. For example, Bucher and Suter AG have a suite of tools that work with Cisco's PG and other unified contact center products. For example, Miratech has created tools for interfacing with the Genesys T-Server. Additionally, both Genesys and Cisco have product programs that allow third parties to integrate directly with these products.

In operation, the real time feedback proxy 100 may send automated communications set-up scripts or case/object tokens to the CTI server 300 which in turn may send corresponding communication commands to an ACD 600, PBX 620 or direct network connection 640 over communication channels 920 (to the ACD), 924 (to the PBX) or 928 (for direct network connection).

The ACD 600 will typically be equipped with a standard CTI communication protocol such as CSTA (an ITU Standard), or TAPI (a Microsoft Standard), or TSAPI (an Avaya Standard). These standard communication protocols may be used to instruct the ACD on doing a call origination to an agent or to set up a conference call between an agent and a user. In this example, the CTI Server 300 does the job of translating the automated communications set-up scripts or case/object tokens received from the real time feedback proxy 100 so that they match the particular CTI protocol of the target ACD 600. In this fashion, the real time feedback proxy 100 becomes a centralized hub from which a plurality of communications may occur amongst a plurality of ACDs 600—each having their own particular connection to ACDs 600.

In another example, the real time feedback proxy 100 may send automated communications set-up scripts or case/object tokens without benefit of the application server or CTI server 300. In such case the real time feedback proxy 100 may send specific communication commands to an ACD 600, PBX 620 or direct network connection 640 over communication channels 921 (to the ACD), 925 (to the PBX) or 929 (for direct network connection).

As shown in FIG. 1, the real time feedback proxy 100 may also provide an interface between one or more reverse automation gateways 200. As illustrated, the real time feedback proxy 100 may interface with one or more reverse automation gateways 200 via communications pathway 918 and/or 919. The communication pathways 918, 919 may utilize any number of standard or proprietary protocols, such as HTTP, REST, or TCP/IP. Communication pathway 919 may also utilize a telephonic or video-based protocol used to convey voice communications or video communications using the SIP or WebRTC protocols mentioned above. An example of a reverse automation gateway is taught in U.S. Pat. No. 8,755,372 entitled Secure Customer Service Proxy Portal, which is incorporated by reference herein.

In another example, the real time feedback proxy 100 interfaces between one or more switching matrices 200. A switching matrix 200 may include a computer-controlled switching system that is configured to direct telephone, video or other multi-channel communications under outboard software state control. Switching matrixes are commonly available in the open source domain. For example, the FreeSWITCH platform handles the voice and messaging capability and is licensed under the Mozilla public license (MPL).

The core FreeSWITCH software library, called libfreeswitch, may be embedded into other applications or can be used as a stand-alone application. It is possible, then, to build an application that may communicate over channels 918 and 919 to the real time feedback proxy 100 from a switching matrix 200 that embeds the FreeSWITCH capability.

In operation, the real time feedback proxy 100 may send automated communications set-up scripts or case/object tokens to the reverse automation gateway 200 for the purpose of setting up corresponding communication commands to an ACD 600, PBX 620 or Direct Network Connection 640 over communication channels 922-923 (to the ACD), 926-927 (to the PBX) or 930-931 (for direct network connection). Communication channels 922, 926, and 930 may, for example, utilize HTTP, REST or TCP/IP protocols. Communication channels 923, 927, and 931 may, for example, utilize SIP or WebRTC protocols.

In another example, the real time feedback proxy 100 may send automated communications set-up scripts or case/object tokens without benefit of the reverse automation gateway or switching matrix 200. In such case, the real time feedback proxy 100 may send specific communication commands to an ACD 600, PBX 620 or direct network connection 640 over communication channels 921 (to the ACD), 925 (to the PBX) or 929 (for direct network connection).

In further reference to the block diagram of FIG. 1, one or more ACDs 600 may be used in the deployment of the real time feedback proxy 100. Vendors such as Cisco and Avaya, for example, supply ACDs worldwide. Once the ACD 600 receives call setup or case/object tokens from the real time feedback proxy 100 (directly), or from the application server or CTI server 300 (indirectly), or from the reverse automation gateway or switching matrix 200 (indirectly), it will have all of the requisite data it needs to connect a user with an agent. This connection may be real time as in a telephone call or chat. This connection may also be a delayed or bulk communication as in a bulk email or bulk social network broadcast. In the context of modern contact centers, ACDs incorporate both email and social channels. For example, offerings from Five9 and LiveOps include email and social communication channels.

Agent terminal(s) 700 are connected to the ACD 600 via communication channels 932 and 933. Communication channel 932 may be a proprietary software communication created specifically by the ACD maker to communicate with a proprietary ACD terminal. The proprietary nature of such a communication channel is shielded, insofar as the communications from the real time feedback proxy 100 either directly, or indirectly, terminate on the server-side of the ACD, not the agent or user side. Communication channel 933 may be an IP-based (Internet Protocol-based) telephonic, or PSTN (Public Switched Telephone Network) or cellular connection to the ACD terminal. This channel may also support and not be limited to email communications, chat, or video.

User terminal(s) 710 are connected to the ACD 600 via communication channels 934 and 935. Communication channel 934 may, for example, support email, chat or SMS type communications. Communication channel 935 may, for example, be an IP-based (Internet Protocol-based) telephonic, PSTN (Public Switched Telephone Network), or cellular connection to the ACD terminal. This channel may also support video, for example. The nature of such a communication channel is shielded, insofar as the communications from the real time feedback proxy 100 either directly, or indirectly, terminate on the server-side of the ACD, not the agent or user side.

In further reference to the block diagram of FIG. 1, one or more PBXs 620 may be used in the deployment of the real time feedback proxy 100. Vendors such as Siemens and Avaya, for example, supply PBXs worldwide. Once the PBX 620 receives call setup and/or case/object tokens from the real time feedback proxy 100 (directly), or from the application server or CTI server 300 (indirectly), or from the reverse automation gateway or switching matrix 200 (indirectly), it will have all of the requisite data it needs to connect a user with an agent. This connection may be real time as in a telephone call or chat. This connection may also be a delayed or bulk communication as in a bulk email or bulk social network broadcast. In the context of modern contact centers, PBXs may incorporate both email and social channels. PBX offerings such as this are commonly available from vendors such as Interactive Intelligence and 8x8, for example.

An agent terminal(s) 720 is connected to the PBX 620 via communication channels 936 and 937. Communication channel 936 may be a proprietary software communication created specifically by the PBX maker to communicate with a proprietary PBX terminal. The proprietary nature of such a communication channel is shielded, insofar as the communications from the real time feedback proxy 100 either directly, or indirectly, terminate on the server-side of the PBX, not the agent or user side. Communication channel 937 may be an IP-based (Internet Protocol-based) telephonic, PSTN (Public Switched Telephone Network) or cellular connection to the PBX terminal. This channel may also support and not be limited to email communications, chat, or video.

A user terminal(s) 730 is connected to the PBX 620 via communication channels 938 and 939. Communication channel 938 may, for example, support email, chat or SMS type communications. Communication channel 939 may be an IP-based (Internet Protocol-based) telephonic, PSTN (Public Switched Telephone Network), or cellular connection to the ACD terminal. This channel may also support video, for example. The nature of such a communication channel is shielded, insofar as the communications from the real time feedback proxy 100 either directly, or indirectly, terminate on the server-side of the PBX, not the agent or user side.

In further reference to the block diagram of FIG. 1, one or more direct network connections 640 may be used in the deployment of the real time feedback proxy 100. In another example, an ACD or PBX may not be needed in order to communicate between the user and an agent. In this scenario, the real time feedback proxy 100, either with or without an application server or CTI server 300 or reverse automation gateway or switching matrix 200, the real time feedback proxy 100 may facilitate a connection between the user 500, 520, 540, 560, 750 and the agent 740 without the benefit of a PBX 620 or ACD 600.

In the scenario wherein the real time feedback proxy 100 does not use an ACD 600 or PBX 620, the real time feedback proxy 100 may be required to maintain a directory of agent connection coordinates and also maintain a state machine to understand the presence (i.e., availability) of the agents. It is typically the function of the ACD 600 or PBX 620 to maintain agent connection information and agent presence information. Specifically, in this scenario, either separately, or in concert with the application server or CTI server 300 and/or reverse automation gateway or switching matrix 200, the real time feedback proxy 100 acts as if it were an ACD 600 or PBX 640 by maintaining both agent connection coordinates and agent presence information.

Agent directory and connection information (e.g., phone number, email address, etc.) may be stored in a database. For example, a commercially available database such as Oracle 12c or Microsoft SQL can be used. Such a database may be implemented as part of the real time feedback proxy 100 in order to know how to connect to each agent.

Agent presence (i.e., availability) technology is commercially available. For example, the Microsoft Lyric Server has built-in presence capability. Open source XMPP (Extensible Messaging and Presence (protocol) server software is also commonly available. One example of an XMPP software is Openfire which is a Java-based software licensed under the Apache License 2.0. By incorporating presence management capability directly into the real time feedback proxy 100, it is possible to determine what agents are available in order for the real time feedback proxy 100 to know when to send communications to those agents.

In the scenario that does not use an ACD 600 or PBX 620, the real time feedback proxy 100 may consume its own case/object token to directly connect an agent to a user. Here, the information collected at a user interface 500, 520, 540, 560, 750 may be used to set up the first leg of the communication. Likewise, both the location of the agent 740 and the availability of the agent 740 may be ascertained by the real time feedback proxy 100 using its database and presence management systems, respectively.

An agent terminal(s) 740 is connected to the direct network connection 640 via communication channels 940 and 941. Communication channel 940 may use the aforementioned XMPP protocol to signal agent availability. Likewise communication channel 940 may be used to provide command and control of other communications such as chat or email. HTTP or WebSocket protocols may be established between the Real Time Feedback Proxy 100 and the agent terminal 640 via the direct network connection 640. Communication channel 941 may use other communication protocols to establish both real time and non-real time communications with the agent. For example, SIP or WebRTC may be used for telephone or video communications directly with the agent. In addition, other standard protocols to transmit SMS, Email or Social data may be used.

In addition, a user terminal(s) 750 is connected to the direct network connection 640 via communication channels 942 and 943. As with an agent connection, communication channel 942 may use the aforementioned XMPP protocol to signal user availability. Likewise communication channel 940 may be used to provide command and control of other communications such as chat or email. Likewise, communication channel 943 may use other communication protocols to establish both real time and non-real time communications with the agent. For example, SIP or WebRTC may be used for telephone or video communications directly with the agent. In addition, other standard protocols to transmit SMS, Email or Social data may be used.

In further reference to the block diagram of FIG. 1, it should be understood that the description of the principles described with regards the use of an ACD 600, PBX 620 or direct network connection 640 are not mutually exclusive. That is, one or more of each system may be used in combination with the real time feedback proxy 100.

It should also be understood that an agent terminal 700, 720, 740 may also manifest as a software program in which scripted instructions for distribution of non-real time messages occur. Such may be the case in distributing a bulk email using SMTP (Simple Mail Transfer Protocol). This may also be the case in distributing a social networking Facebook Fan Page message using the Facebook GraphAPI, or in distributing a social networking Twitter message using the Twitter API.

In this bulk message" scenario, the real time feedback proxy 100 may facilitate the distribution of messages to many users simultaneously, based on triggers built in to its own application software state control, as described below with reference to FIG. 2.

Figure 2:
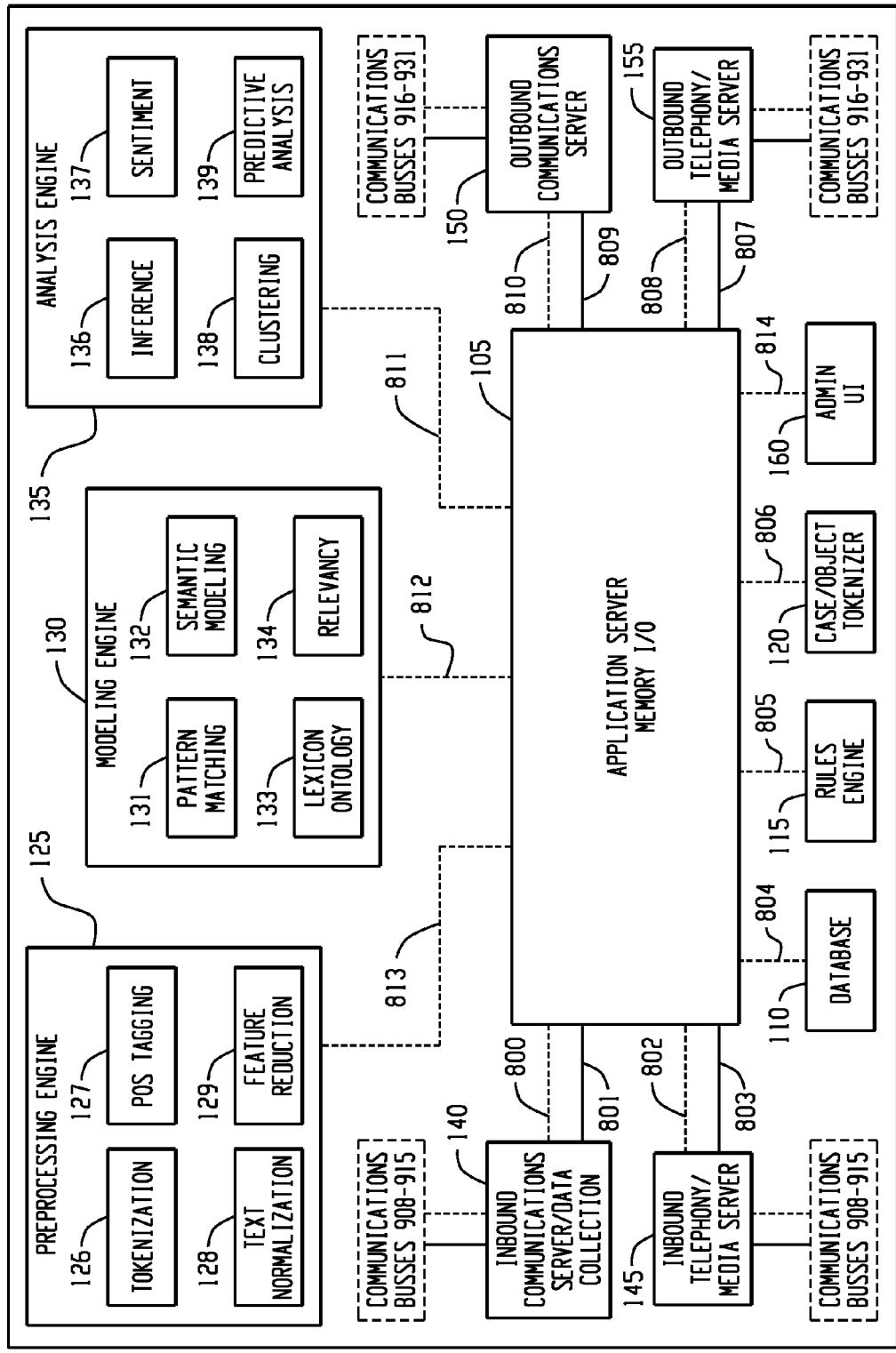
FIG. 2 is a block diagram illustrating example components of a real time feedback proxy.

FIG. 2 is a block diagram illustrating example components of a real time feedback proxy 100. As shown, the real time feedback proxy 100 includes an application server and memory I/O component 105. The application server and memory I/O component 105 represents a software program, also called a "server," that 1) handles inbound and outbound communications (by way of inbound and outbound communication servers 140, 145, 150, 155; 2) stores essential data for users, agents, configuration and real-time and schedule data by way of a common database 110; 3) creates and executes on specific business rules as depicted by the rules engine 115; 4) creates and distributes case/object tokens as depicted by the case/object tokenizer 120; 5) pre-processes text data by way of the preprocessing engine 125; 6) models text meaning and relevancy by way of the modeling engine 130; and 7) analyzes text data for inference, clusters, sentiment and trends as depicted by the analysis engine 135.

The inbound and outbound communication servers 140, 145, 150, 155 (referenced above with respect to FIG. 1) are also referred to as the communications server array.

The application server and memory I/O component 105 may, for example, be a web-based server using PHP, Java or .NET components. The server 105 may also be written in traditional languages such as the C programming language. The particular language and choice of memory management or I/O (Input/Output) mechanisms notwithstanding, the server 105 is the central control of the real time feedback proxy 100.

The database 110 may be deployed using a shared design, such as Oracle database software or Microsoft SQL. The database 110 is connected to the application server and memory I/O component 105 over communications channel 804. There are a variety of database communications packages available that allow applications to communicate with databases, such as JDBC (Java Database Connectivity API) and ODBC (Open Database Connectivity). Database connections may be implemented using common firewall ports, such as TCP/IP port 1433 or 1521.

The rules engine 115, also referred to as a decisioning platform or business rule management system (BRMS), is used by the application server and memory I/O component 105 to programmatically decide when and under what circumstances certain actions should take place. The rules engine 110 is a modular component in the illustrated example. But in other examples, the rules engine could be written as part of a proprietary program that is built into the application server and memory I/O component 105. A rules engine 110 implemented as a modular component, as depicted in FIG. 2, accommodates the use of existing enterprise decisioning tools. For example, a known enterprise rules engine platform is the Drools system that is part of the JBoss Enterprise BRMS product. Drools may run as an enterprise application platform or as a web platform. Another commercially available BRMS is the Activiti BPM platform.

By way of example, the current disclosure contemplates the use of rules based on concepts such as: "Connect a user to an agent right now if the person is angry." Or: "send a bulk message to all users if we predict a certain product will be returned at over 20 percent during the first month of launch." As to whether or not a person is angry or if there is a trend purporting the return of more than 20 percent of a product—that is handled via the invocation of data offered by use of the preprocessing engine 125, modeling engine 130 and analysis engine 135, as described below.

In further reference to the block diagram of FIG. 2, the case/object tokenizer 120 may prepare a case or an object in the form of a transmittable token upon the application server and memory/I/O 105 receiving notification that a certain rules trigger exists (as ascertained by the rules engine 115.) In one example, the transmittable Token will be subsequently consumed and processed by the application server or CTI server 300 or the reverse automation gateway or switching matrix 200. The purpose of the case/object tokenizer 120 is not solely to create tokens, but to create them in the specific format that the target ACD 600 or PBX 620 or direct network connection 640 needs to process them in.

A token created by the case/object tokenizer 120 may also be associated with a unique interaction ID (Identification Number), which may be generated by the case/object tokenizer 120 or, alternately, by the application server and memory/ I/O 105. A unique interaction ID may be useful in coordinating connections between various components of the real time feedback proxy and the systems it connects to. Other attributes the case/object token may, for example, include: queue priority, customer influence, customer priority, customer sentiment, and other attributes that may be consumed by a reverse automation gateway or switching matrix 200, or consumed by an application server or CTI server 300. Alternately, the token generated by the case/object tokenizer may include unique interaction IDs and other attributes that are consumed by the ACD 600, PBX 620 or direct network connection 640 as per the individual requirements of each of those entities.

In another example, a token created by the case/object tokenizer 120 may be consumed and acted upon directly by the application server and memory/I/O 105 and used to facilitate a communication without the benefit of an ACD 600 or PBX 620, but rather be the software state controller for agent connection information and agent presence information as described above.

In further reference to the block diagram of FIG. 2, the inbound communications server/data collection module 140 is part of the communications server array. This module 140 may be used to collect relevant information from the IVR feedback collection instrument 400, web/email feedback collection instrument 420, mobile feedback collection instrument 440, and TV feedback collection instrument 460. The collection of relevant information may occur over communications channels 908 through 915, as described above with reference to FIG. 1. In one example, the inbound communications server/data collection module 140 will not only collect relevant information, but will also parse and arrange the data into a common format that can be easily processed by the application server and memory/I/O 105. In this fashion, the application server and memory/I/O 105 becomes an aggregator of incoming data from all of the user terminals 500, 520, 540, 560. In particular, the inbound communications server/data collection 140 may concentrate on communications of a non-telephonic type. Alternately, the inbound communications server/data collection module 140 may incorporate communications of both a telephonic or non-telephonic type.

By way of example, the inbound communications server/data collection module 140 may collect web-based breadcrumb or customer experience analytics information related to an e-commerce session initiated by a user. Such information may be further processed by the application server and memory I/O 105 to ascertain the suitability of making a real time connection between the user and a live agent. Likewise, the inbound communications server/data collection module 140 may collect massive data from a plurality of social networks related to user sentiment on a particular product launch. Such information may be further processed by the application server and memory I/O module 105 to initiate mass or bulk communication to a plurality of users or in making a public broadcast message.

In further reference to the block diagram of FIG. 2, the inbound telephony/media server 145 is part of the communications server array, and may be used to collect relevant information from the IVR feedback collection instrument 140, web/email feedback collection instrument 420, mobile feedback collection Instrument 440, and TV feedback collection instrument 460. The collection of relevant information may occur over communications channels 908 through 915, as shown in FIG. 1. In one example, the inbound telephony/media server 145 may not only collect relevant information, but may also parse and arrange the data into a common format that can be easily processed by the application server and memory/I/O 105. In this fashion, the application server and memory/I/O 105 becomes an aggregator of incoming data from all of the User Terminals [500] and [520] and [540] and [560] as described above. In particular, the inbound telephony/media server 145 may concentrate on communications of a telephonic type. Alternately, the inbound telephony/media server 145 may incorporate communications of both a telephonic or non-telephonic type.

By way of example, the inbound telephony/media server 145 may collect IVR-based touch-tone or speech input based on a customer survey conducted via IVR. Such information may be further processed by the application server and memory I/O 105 in order to ascertain the suitability of making a real time connection between the user and a live agent. Likewise, the inbound telephony/media server 145 may collect text information from an email or a chat conversation with a user. Such information may be further processed by the application server and memory I/O module 105 in order to ascertain the suitability of connecting the user with a different agent than the user is currently conducting a chat with. Alternately, an email from a plurality of users may be used to ascertain a certain trend that could subsequently be used as the basis for a bulk/mass communication as explained above.

In further reference to the block diagram of FIG. 2, the outbound communications server 150 is part of the communications server array, and may be used to pass relevant information and tokens from the application server and memory/ I/O 105 to the application server or CTI server 300 and the reverse automation gateway or switching matrix 200. The distribution of relevant information and tokens may happen over communications channels 916 through 931, as shown in FIG. 1. In one example, the outbound communications server 150 may not only distribute said relevant information and tokens, but may also process bidirectional command/reply data that can be easily processed by the application server and memory/I/O 105. In this fashion, the application server and memory/I/O 105 becomes an aggregator for outgoing data to the agent terminals 700, 720, 740. In particular, the outbound communications server 150 may concentrate on communications of a non-telephonic type. This, for example, would constitute communications with an applications server or CTI server. Alternately, the outbound communications server 150 may incorporate communications of both a telephonic or non-telephonic type.

By way of example, the outbound communications server 150 may distribute specific call set-up or bulk communications commands to an application server or CTI server 300. Such a command may be "connect user 500 with agent 700." Alternately, such a command may be to "send a bulk email announcement to all users." Likewise the outbound communications server 150 may distribute or broadcast data to a plurality of social networks related to user sentiment on a particular product launch.

In further reference to the block diagram of FIG. 2, the outbound telephony/media server 155 is part of the communications server array, and may be used to pass relevant information and tokens from the application server and memory/

I/O 105 to the reverse automation gateway or switching matrix 200. The distribution of relevant information and tokens may occur over communications channels 916 through 931, as shown in FIG. 1. In one example, the outbound telephony/media server 155 may not only distribute said relevant information and tokens, but may also process bidirectional command/reply data that can be easily processed by the application server and memory/I/O 105. In this fashion, the application server and memory/I/O 105 becomes an aggregator for outgoing data to all of the agent terminals 700, 720, 740. In particular, the outbound telephony/media server 155 may concentrate on communications of a telephonic type. Here, such communications may come in the form of automated scripts that are consumed by a reverse automation gateway or switching matrix 200 that allow the real time feedback proxy system 100 to bypass the use of an application server or CTI server and, alternately, evoke the use of robotic scripts that emulate the input of a user—and thus help to navigate ACDs, or IVRs, or other systems on behalf of the user.

By way of example, the outbound telephony/media server 155 may distribute a plurality of automated scripts and tokens to a plurality of reverse automation gateway or switching matrices 200. In this example, the real time feedback proxy system 100 can be used on behalf of a plurality of enterprises, each to its own particular needs but still nonetheless using a centralized system to do so.

In further reference to the block diagram of FIG. 2, the preprocessing engine 125 performs text corpus preprocessing, for example to filter bulk text. The preprocessing engine 125 may be a server running Python or Java software or any other suitable programming language with support for natural language processing tools and libraries. The input of such text may be information transmitted by the IVR feedback collection instrument 400, the web/email feedback collection instrument 420, the mobile feedback collection instrument 440, or the TV feedback collection instrument 460, as described above. Such text is subsequently transmitted from the application server and memory/I/O 105 to the preprocessing engine 125 via communications link 813. Such a link may be manifest as a memory hash table or may be a communications bus meant for inter-process communications. For example, RabbitMQ or Apache ActiveMQ are popular communications busses that may be utilized.

Before a collection of items can be analyzed for spam, sentiment and clusters, certain transformations should be applied. These transformations include tokenization, part of speech tagging, text normalization and feature reduction. Many tools exist that provide implementations of commonly used algorithms to perform these tasks, such as Stanford CoreNLP and The Natural Language ToolKit (NLTK) as well as lexical resources as WordNet.

The preprocessing engine 125 is therefore comprised of several parts including: 1) a tokenization module 126; 2) a POS (Part of Speech) tagging module 127; 3) a text normalization module 128; and 4) a feature reduction module 129.

The tokenization module 126 performs lexical analysis in which a corpus of text is broken up into phrases, words, symbols and tokens. Available tools can be used to for this function, such as the open source Apache OpenNLP that includes statistical tokenizers for many languages. The part of speech tagging (POS) module 127 identifies which words are nouns, verbs, adjectives, adverbs, articles, pronouns, conjunctions, interjections, and prepositions.

text normalization 128 is the process by which a corpus of text is transformed to a regular or common expression based on certain rules such as the contextual meaning of words. Combined with lexical references, text can be abbreviated or replaced by similar word that fit the circumstance.

Feature reduction 129 (i.e., feature selection) is the discipline of machine learning that attempts to classify the most relevant features in a text corpus. This is typically done with an SVM (Support Vector Machine) to do classification of text. Feature reduction 129 is typically performed after stop-words removal has occurred in earlier preprocessing steps. Popular software libraries for feature reduction include LibSVM and LibLINEAR, both of which are open source SVMs.

Through the text preprocessing and filtering operations of the tokenization module 126, POS tagging module 127, text normalization module 128 and feature reduction module 129, the preprocessing engine 125 performs the pre-filtering and "clean up" of the text provided by the application server and memory/I/O 105 as part of the real time feedback proxy 100.

In one example, the administrator of the system may use an Admin UI 160 to access the preprocessing engine 125 in order to set certain parameters or norms for how the preprocessing engine 125 will work. For example, the administrator may wish to manually input a list of "stop words" so certain common words such as: "at," "on," and "is," etc. are ignored. This may, for example, be useful in improving the performance of feature reduction or for other pre-processing parameter setting.

Referring again to FIG. 2, text may be further processed by a modeling engine 130 after initial filtering is performed by the preprocessing engine 125. The modeling engine 130 may communicate over communications channel 812 to the application server and memory/I/O 105 in the same way as the preprocessing engine 125 (i.e., via a memory hash table or inter-process communications bus such as RabbitMQ or Apache ActiveMQ.) It may be possible for the preprocessing engine 125 to communicate directly with the modeling engine 130 over a separate communication bus. The modeling engine 130 may be a server running Python or Java software or any other suitable programming language with support for natural language processing tools and libraries. As shown in FIG. 2, the modeling engine 130 may perform the following tasks: pattern matching 131; semantic modeling 132; lexicon and ontology maintenance 133; and relevancy scoring 134.

Further refinement of the support vector machine classification of text achieved in the feature reduction module 129 may be performed by the pattern matching 131 process of the modeling engine 130. Using pattern matching 131, text that has been translated into a vector space model can be analyzed for meaningful patterns. For example, further patterns can emerge using TF-IDF weighting (Term Frequency-Inverse Document Frequency). Known methods include the Python-based library called "tf-idf" and the Scikit-Learn tool.

With reference again to the modeling engine 130 depicted in FIG. 2, the semantic modeling function 132 processes text structures, such as sentences, phrases, and paragraphs, in order to derive overall meaning Semantic modeling can be done independent of language. The semantic modeling 132 function may also be used to distinguish between figurative vs. literal phrases. For example, this may be useful in understanding idioms and cultural nuances of speech.

In one example, the administrator of the system may use the Admin UI (User Interface) 160 to create semantic structures (key-operator-value definitions) that can be fed into the semantic modeling 132 engine to model clear sentences or modify semantic structures in order to easily identify the meaning of commonly used dialogs created by the users or apparent in a big data search of social networking posts. In addition, the Admin UI (User Interface) 160 may be used to delete semantic structures identified by the semantic modeling 132 engine that are no longer required.

The lexicon and ontology engine 133 performs both concept taxonomy and logical relations to that taxonomy. For example, the lexicon part is used to organize many words as part of an overall "concept inventory." In the context of natural language processing, a lexicon is essentially a dictionary of meaningful words. After the taxonomy of this word inventory is created, the ontological function is used to link the logical relationship between the concepts represented by the words. In one example, the administrator of the system may use the Admin UI (User Interface) 160, to create and maintain a lexicon of valid words and to also manipulate the logical relationships between those words for the ontological function 133. The lexicon and ontological function may be useful in disambiguating sentences and meaning.

The modeling engine 130 may also include a relevancy function as depicted by the relevancy engine 134. Many machine learning algorithms can be applied to create a filter that distinguishes how actionable or relevant certain words and phrases are. For example, a relevancy filter is useful to categorize a piece of text as being "spam" or unwanted information. Available algorithms that can be used for relevancy filtering include, for example, linear regression (e.g., Lyric an open source item available in JavaScript), support vector machines (e.g., LIBSVM, an open source library), and other tools such as Maximum Entropy Classifier (e.g., the Stanford Classifier).

In one example, the administrator of the system may use the Admin UI 160 to access the modeling engine 130 output in order to "train" the accuracy of the modeling engine 130. For example, an item that is marked by the modeling engine 130 as "spam" can be corrected by the administrator using the Admin UI 160. This training may add confirmed data to the modeling engine 130 corpus so as to provide it with a means to learn between spam and not spam.

With reference again to FIG. 2, an analysis engine 135 is connected to the application server and memory/I/O 105 via a communications channel 811 in the same fashion as the preprocessing engine 125 (i.e., via memory hash table or inter-process communications bus such as RabbitMQ or Apache ActiveMQ.) It is possible for the analysis engine 135 to communicate directly with the modeling engine 130 or the preprocessing engine 125 over a separate communication bus. The analysis engine 135 may, for example, be a server running Python or Java software or any other suitable programming language with support for natural language processing tools and libraries. As shown in FIG. 2, the analysis engine 135 may perform various tasks including inference calculations 136, sentiment analysis 137, clustering 138, and predictive analysis 139.

Further to the inclusion of the inference 136 capability in the analysis engine 135, it is instructive to contemplate the context in which inference may be used in text processing. Based on an understood premise(s) that is known to be true (or assumed true), inference is the process of formulating a logical conclusion from this premise. Inference is used to affect some kind of reasoning on top of a collection of premises. For example, following is a well-known example of inferences in an conclusion in the three-part logical progression: 1) all men are mortal; 2) Socrates is a man; and 3) therefore, Socrates is mortal. This is the basis for more sophisticated logic that can be applied programmatically to analyze text in the field of natural language processing. Available tools with which to do inference calculations on a corpus of text include, for example: the open source inference libraries called libDAI, and BUGS (Bayesian Inference Using Gibbs Sampling).

Another aspect of the analysis engine 135 is the sentiment 135 function. The sentiment function 135 may, for example, provide an understanding of whether or not a sample of text represents, "happy," "angry," "sad," etc. Such sentiment may represent an individual's feelings or the general feelings of a group of people. A sentiment function 135 can be applied to a large sample of text to approximate the general sentiment of a larger audience. Sentiment analysis 135 may use a similar approach to filtering text as performed by the relevancy function 134 function included in the modeling engine 130. In addition, sentiment analysis 135 may use semantic analysis similar to the semantic modeling 132 feature of the modeling engine 130. For example, sentiment analysis 135 may benefit from semantic word-sense disambiguation, term weighting and synonym expansion. All of this draws upon Lexical resources including dictionaries, thesauri, and ontologies as well.

Another aspect of the analysis engine 135 is the clustering function 138. Simply put, clusters are groups of words that lend themselves to specific buckets of meaning. For example, some words used in several phrases may be analyzed to indicate that a customer is asking for technical support, or perhaps wishes to speak to someone about their bill. For example the phrases: "I have a problem with my monitor" and "Please help me with flickering on my screen" may be regarded as belonging to the "Technical Support Cluster." Popular algorithms for cluster detection include, for example, k-means or x-means algorithms that can be used by Latent Dirichlet Allocation (LDA) or Latent Semantic Analysis (LSA) for topic modeling. Once the clusters are defined by the clustering function 138, an algorithm such as Naive Bayes Classifier can be used to assign clusters to new items programmatically.

The clustering function 138 can also be used to analyze a list of most frequently used terms in articles, blogs and social sites to analyze trends. For example, a "semantically filtered" word cloud (i.e., related topics) generated from Semantic and Lexical Analysis may be compared with default word clouds for "real" trends and exclusions. These comparisons may, for example, be achieved programmatically inside the clustering function 138 in order to improve future natural language processing precision.

Another aspect of the analysis engine 135 is the predictive analysis function 139, which is used to establish predictable trends. For example, the ability to anticipate the sentiment (mood) of customers regarding a certain subject; or for example, to anticipate the level of resources that may be applied to solve a certain problem that affects more than one customer. It should be understood, however, that these are by no means the only examples of how anticipating trends can be used in the context of a customer service or contact center scenario. This capability may be useful in anticipating required contact center actions, whether they are automatic, semi-automatic, or manually implemented. Such actions may be the escalation of a particular interaction with a customer. Such an escalation may take a web visitor and connect them automatically to a live agent or supervisor. Or an action may be triggered to send a broadcast message out to a social network or bulk email list with instructions for a product recall.

Examples of predictive analysis disciplines include: 1) up trend/down trend event prediction; 2) parabolic prediction; 3) level prediction; and 4) predictive scoring. Open source predictive analytics tools that may be applied to do these calculations include Apace Mahout, GNU Octabe, and SciKit-learn.

In one example, the administrator of the system may use the Admin UI 160 to access the analysis engine 135 data in order to trigger rules that are defined in the rules engine 115. For example, such a user interface may include a forms-based method to indicate how many instances or mentions of a certain cluster (topic), or the predictive "slope" of those clusters would constitute an alarm that would produce an automated message via email or a post to a social network.

Data interchange between the analysis engine 135 and the rules engine 115 may, for example, be conducted via the message busses (discussed above), or by way of a "database-driven" design in which all data generated by all elements for the real time feedback proxy 100 are both stored and shared in the database 110 on an as-needed basis.

An example of how both predictive analysis and rules may be used in concert with one another is manifest in a supervisor escalation scenario. In one example, an administrator may be able to establish customer satisfaction thresholds in which case/object tokenized scripts generated by the real time feedback proxy may also include instructions to trigger a real time communication to a supervisor or specialist instead of a regular agent. For example, if customer sentiment or feedback was below a preset threshold (e.g., 70%), then a communication could be automatically sent to the customer stating that because of their sentiment, special attention shall be afforded to that customer in the form of a real time communication with a supervisor. Based on the thresholds and rules chosen by the administrator, such a communication may then be automatically triggered by the real time feedback proxy. Such automatic triggers may be used to create the aforementioned case/object tokenized scripts that would provide the requisite instructions to an ACD, PBX or direct connection for the supervisor to be connected to the customer.

Similarly, in one example, the administrator may also able to indicate what type of feedback or sentiment data may be filtered and transmitted to a quality monitoring system in order to enhance the records of agent activity with customers. Such quality monitoring systems may be used to gauge the efficacy and adherence to policy of agents. In this regard, the feedback and sentiment of a customer before, during and after a communication may be gauged by the real time feedback proxy. Here, the aforementioned case/object tokenized scripts may be used to instruct an associated quality monitoring system with the progression of sentiment or feedback during said transaction. This may provide a more rich understanding of how the agent was successful or unsuccessful in improving the customer's sentiment during a communication. Such information may, for example, be invaluable to supervisors in onboarding and coaching agents.

In further reference to the block diagram of FIG. 2, the Admin UI 160 may also be used for other purposes. For example, the Admin UI 160 may be used to define customer profiles, agent profiles, and other user profiles, credentials and coordinates. The Admin UI 160 may also have utility in defining data stream protocols and messaging packets for communicating between the application server and memory/I/O 105 and its various communications servers that are part of the communications server array. For example, the Admin UI 160 may be used to identify social network data streams and API (Application Programming Interface) commands necessary to collect text from social network feeds.

In one example, the Admin UI 160 may be used to identify IVR scripting and API (Application Programming Interface) commands necessary to collect data from third party IVR systems. For example, the Admin UI 160 may be used to identify REST-based commands necessary to collect data from a web site. Such data from a web site may include forms data filled out by a customer or breadcrumb data associated with a particular customer. In addition, the inputs described above for data collection in the inbound communications server/data collection 140 and inbound telephony/media server 145 may be contemplated for administrative input via the Admin UI 160. In addition to the inbound communication server functions, the Admin UI 160 may also be used to control administrative aspects of the outbound communications server 150 and the outbound telephony/media server 155.

The Admin UI 160 may also be used to identify suggested knowledge base articles or other gathered information gleaned from the inbound communications server 140 or the web/email feedback collection instrument 420, shown in FIG. 1. A specific example for this use would be for an administrator to review trend-based information or suggestions from the analysis engine 135 relative to a question or set of questions or feedback on a certain product. In addition, trend information could also be collected from a series of email communications that had been collected. Here, the administrator may intervene by selecting certain "answers" suggested by the analysis engine 135. The circumstances under which an administrator would manually intervene to select answers vs. allow the system to automatically select and distribute answers can be set up as rules and rules triggers in the rules engine 115.

Figure 3A:
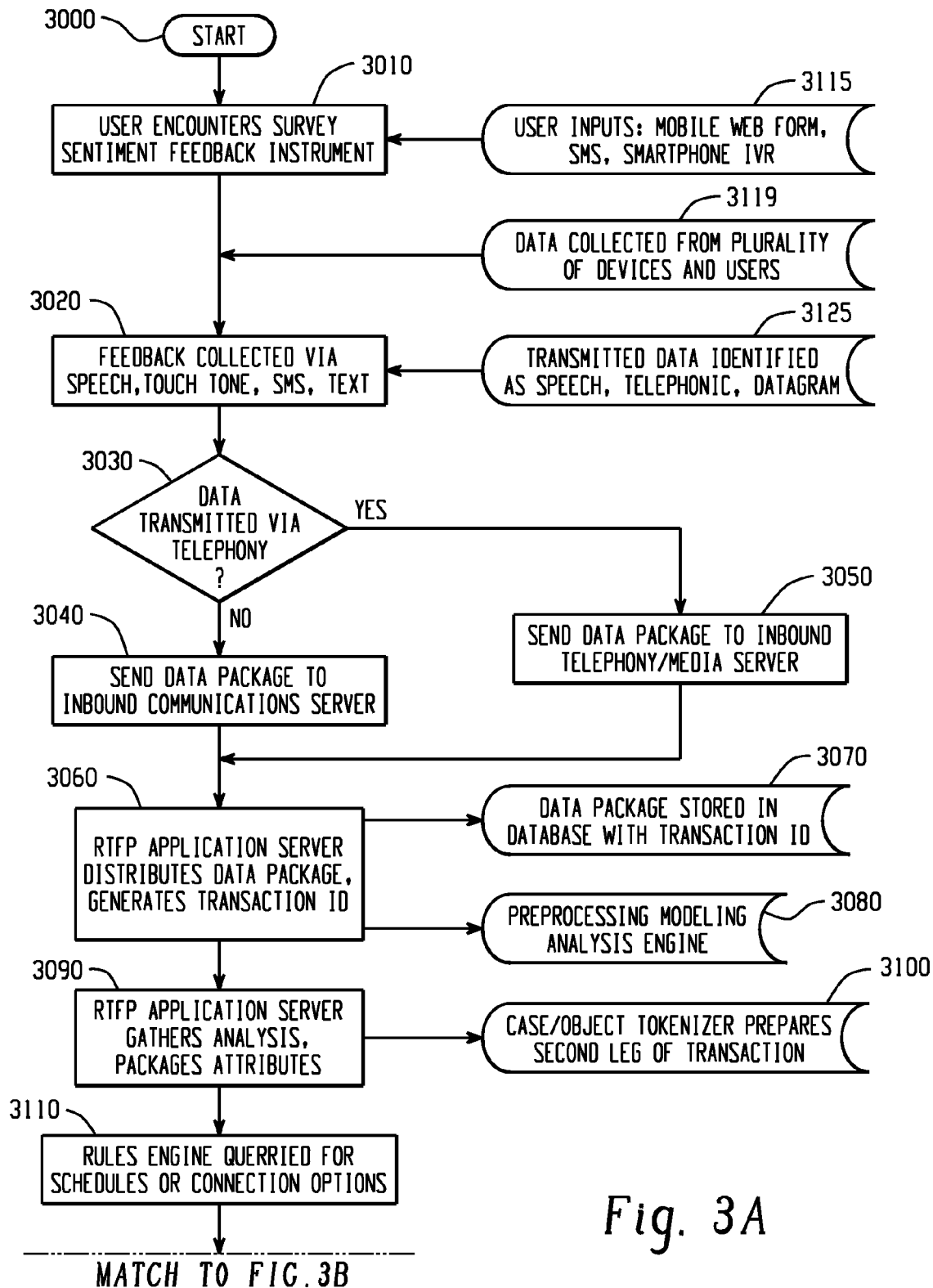
FIGS. 3A-3C are a flow chart illustrating an example of the overall logic flow for an individual or bulk communication initiated by an IVR or Mobile-based customer interaction.
Figure 3B:
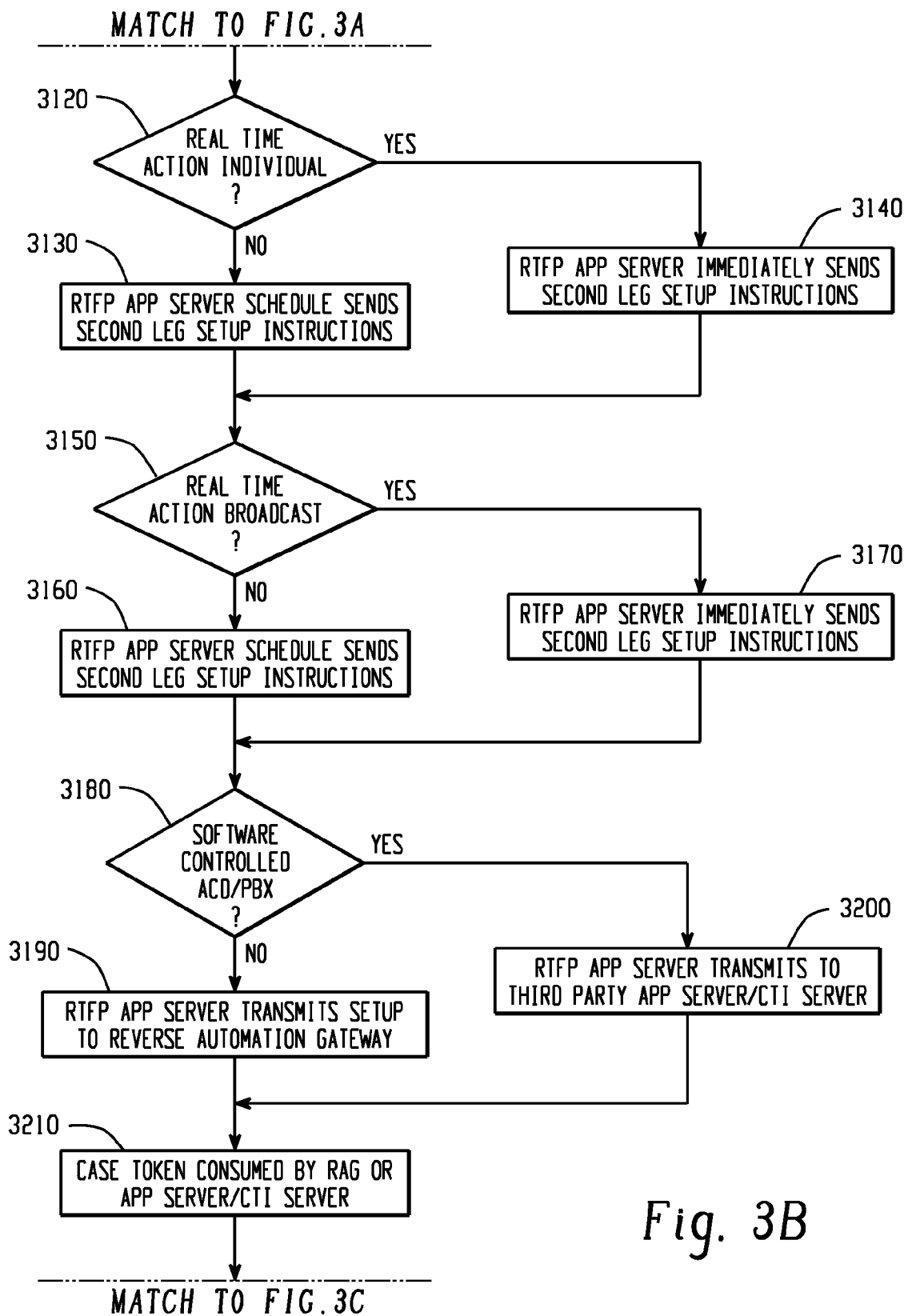
Figure 3C:
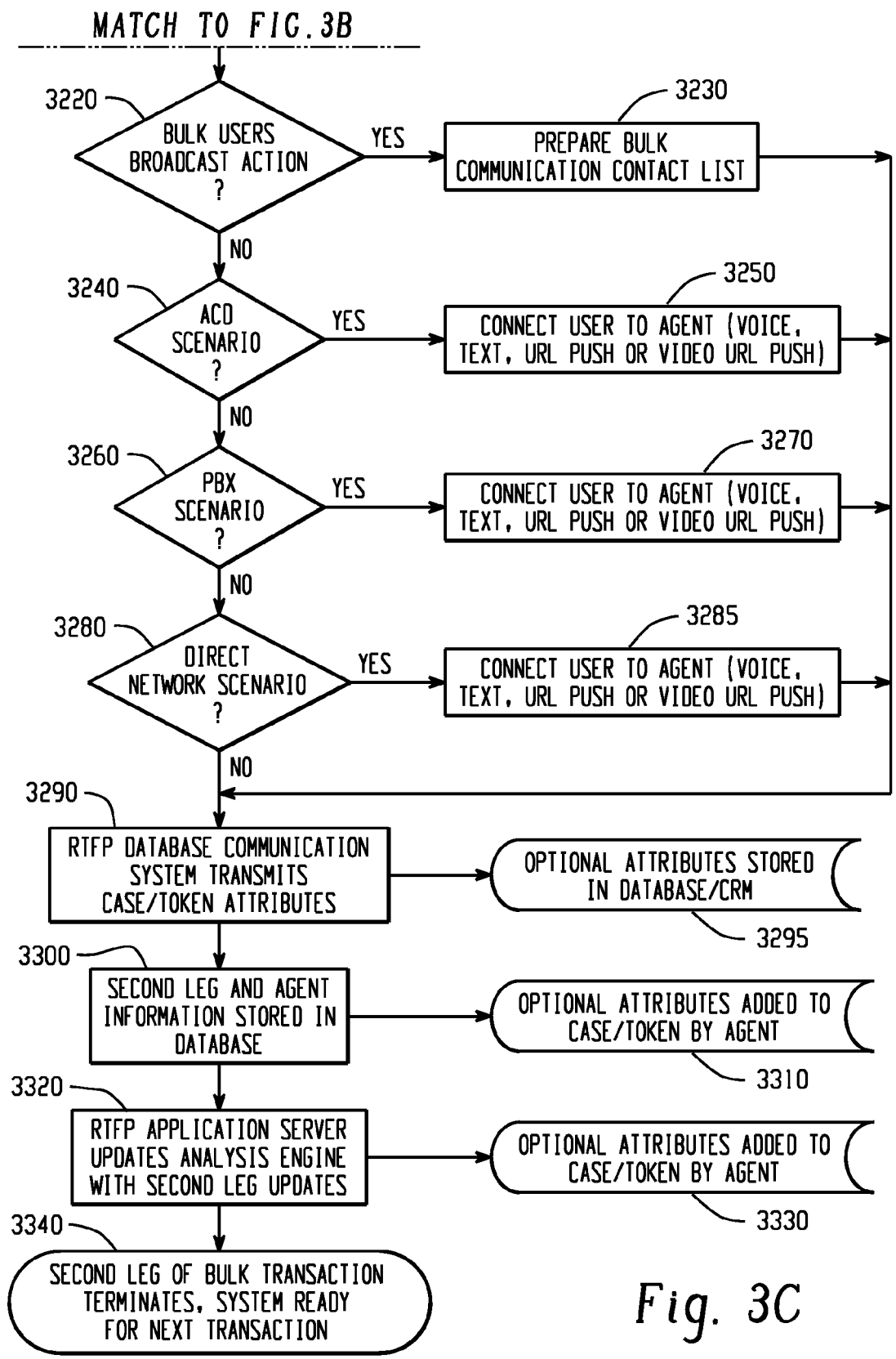

FIGS. 3A-3C include a flow chart illustrating one example of the overall logic flow for an individual or bulk communication initiated by an IVR or mobile-based customer interaction. Such interaction may be singular, with attention to one user, or it may pertain to a search of data pertaining to many users' collective feedback.

At 3000, the logic flow begins with particular attention in this scenario to telephonic and speech-based input from a user. At 3010, the user encounters one of several input modes with which sentiment and other feedback can be collected. Such feedback may be a response to a solicited question posed to the user or, alternatively, the feedback may be an unsolicited question from the user. Solicited IVR input is typically manifest as a post-automation survey in which the IVR system would ask a series of questions allowing for touch-tone or speech-based response from the user. The user feedback may also come in the form of a verbatim quote—that is to say a free-form spoken recording of the user's words. Such a recording may be transformed into text using high-speed speech analytics algorithms. This transformation of speech to text may be useful in analyzing both solicited and unsolicited feedback from the user.

Input may, for example, come in the form of a mobile web form filled out by the user, or SMS (Short Message Service) text, or options offered in a native smartphone application as depicted at 3115.

Such data may be collected from a plurality of mobile devices, or may uploaded in bulk from an IVR system or social network constituting collective feedback or sentiment from many people simultaneously, as depicted at 3119. In this scenario, the inbound telephony/media server 145 or inbound communications server/data collection 140 may be used as data aggregation points in order to parse and transmit relevant data to the application server and memory/I/O 105.

Regardless of input modality (i.e., touch-tone, speech commands, free-form speech, big data search, search of knowledge base data, etc.), the IVR or mobile device(s) may be used to collect and transmit data represented at 3020. At 3125, the data to be transmitted is identified as being speech, telephonic, or datagram-oriented.

At 3030, the decision of whether the collected data will be transmitted via telephony versus data communications is determined. If by data communications, the data is transmitted to the inbound communications server/data collection 140 as depicted at 3040. If by telephony, the data is transmitted to the inbound telephony/media server 145, as depicted at 3050.

At 3060, the real time feedback proxy 100 processes the data collected by the inbound communications server/data collection 140 or the inbound telephony/media server 145. Here, the application server and memory/I/O 105 generates a unique interaction ID, as described above with reference to FIG. 2. This interaction ID and other information associated with the data collected will then be stored in the database 110, as depicted at 3070. Text data associated with the same transaction is transmitted by the application server and memory/I/O 105 to the preprocessing engine 125, as depicted at 3080. Such transmission may also include a "copy" of the data to the other natural language processing elements of the real time feedback proxy 100 including the modeling engine 130 and the analysis engine 135. Such data may be processed either in parallel, or in serial by the natural language processing elements.

At 3090, the application server and memory/I/O 105 gathers from the analysis engine 135 all of the requisite output and characterizations of the text that was analyzed for a particular unique interaction ID. Such characterizations may, for example, include user sentiment, word cluster information, and trend analysis data.

At 3100, the application server and memory/I/O 105 takes the data from the previous step 3090 and packages it for consumption by the case/object tokenizer 120. Directly afterwards or alternately in parallel, the application server and memory/I/O 105 queries the rules engine 3110 for essential information dealing with actions to take on the interaction in question. Such actions may, for example, include: 1) immediate, real-time connection between a user and an agent; 2) scheduled, real-time connection between a user and an agent based on customer preference; 3) immediate broadcast of information to a single user via email or SMS or social networking channels; or 4) scheduled broadcast of information to a plurality of users via email or SMS or social networking channels.

An example of the varied decisions contemplated by the rules engine 115 is depicted at 3120. Here, for example, a determination of taking immediate action versus a scheduled communication is finalized for an individual user. If a scheduled transaction is called for affecting an individual user, the application server and memory/I/O 105 packages the requisite commands so they can be made part of the token created by the case/object tokenizer 120 as depicted at 3130. If an immediate transaction is called for affecting an individual user, then the application server and memory/I/O 10 packages the requisite commands so they can be made part of the token created by the case/object tokenizer 120 as depicted at 3140.

At 3150, a determination of taking immediate action versus a scheduled communication is finalized for a bulk or broadcast type of communication affecting a plurality of users. If a scheduled transaction is called for affecting a plurality of users, then the application server and memory/I/O 105 packages the requisite commands so they can be made part of the token created by the case/object tokenizer 120 as depicted at 3160. If an immediate transaction is called for affecting a plurality of users, then the application server and memory/I/O 105 packages the requisite commands so they can be made part of the token created by the case/object tokenizer 120 as depicted at 3170.

At 3180, the application server and memory/I/O 105 makes a determination if the outbound communication will be targeted towards a software controlled ACD or PBX. If a reverse automation gateway or switching matrix are to be used as depicted at 3190, such a communication would be conveyed via the outbound telephony/media server 155. The outbound telephony/media server 155 then transmits the appropriate information to the reverse automation gateway or switching matrix 200. If a software controlled ACD or PBX are to be used as depicted at 3200, then such a communication is conveyed via the outbound telephony/media server 155. The outbound telephony/media server 155 then transmits the appropriate information to the application server or CTI server 300.

At 3210, the token generated by the case/object tokenizer 120 is consumed by the target platform (e.g., ACD, PBX, Reverse Automation Gateway, etc.). Such a token will have already been packaged to use the specific protocols of the target platform, as described above with reference to FIG. 2.

At 3220, the method determines if the preceding action included a broadcast message. If so, then a broadcast to a plurality of users is be prepared at 3230 which is consistent with the list management, format, and protocol of the target platform. Any documents or lists may be generated by the application server and memory/I/O 105 or the case/object tokenizer 120 and packaged as required for the target platform. There are a variety of known APIs, flat files, and other methods that may be used for achieving this purpose. In the context of the real time feedback proxy 100, these APIs, flat files, and other methods may be triggered by the token generated by the case/object tokenizer 120.

At 3240, if the communication was sent to an ACD, then the ACD connects the user to an agent at 3250. Such a connection may be performed in real time using telephony, or alternately may be started with a URL (Uniform Resource Locator) "push" to the user. For example, the ACD may send a user-to-agent chat link to the user via a URL push or alternately may send a user-to-agent callback link to the user via a URL push.

At 3260, if the communication was sent to a PBX, then the PBX connects the user to an agent at 3270. Such a connection may be performed in real time using telephony, or alternately may be started with a URL (Uniform Resource Locator) "push" to the user. For example, the PBX may send a user-to-agent chat link to the user via a URL push or alternately may send a user-to-agent callback link to the user via a URL push.

It is instructive to note that the use of a reverse automation gateway or switching matrix 200 may also be used to connect the real time feedback proxy 100 to users. In this case, the token generated by the case/object tokenizer 120 is consumed by the reverse automation gateway or switching matrix 200 and used as an automated script that emulates the input of a user and on behalf of a user encountering a PBX or an ACD that has some form of IVR input required.

A direct network connection may be achieved without the benefit or use of an ACD or PBX, as depicted at 3280. In this scenario, the application server and memory/I/O 105 communicates directly to a public or private network and uses its own agent availability and coordinates information to connect users with agents. The application server and memory/I/O 105 may construct its own scripts, lists, API commands or protocols to initiate bulk communications to a plurality of users.

At 3290, the real time feedback proxy 100 may additionally transmit subsequent user data to the target platform. For example, additional attributes related to an existing token with an existing interaction ID may be collected during an existing transaction. Such data may be subsequently transmitted in order to benefit the agent in processing the transaction more efficiently. For example, such subsequent attribute information may include a change in sentiment (either good or bad) that may in turn trigger the rules engine 115 to escalate said interaction. It should be understood, however, that other information may also be transmitted at this step. For example, additional information on the influence or buying power of a user may be transmitted after the connection has been made. At 3295, such data may be stored in the database 110, or alternately in a CRM (Customer Relationship Management) system in order to enhance the records kept on behalf of the user or users in question.

Data relative to agent actions may be stored at 3300. At 3310, additional attributes may be collected manually by the agent and stored alongside information that was collected automatically.

At 3320, the real time feedback proxy 100 may take data collected after connection to an agent or broadcast and feed it back to the natural language processing elements, including the modeling engine 130 and the analysis engine 135, in order to perfect the accuracy of trend analysis or other algorithms. As depicted at 3330, additional attributes associated with a specific interaction ID and token may also be stored, such as manual data collected by the agent. For example, an agent may wish to indicate that a user's sentiment or level of satisfaction substantially changed at the end of a transaction. This type of data may be used by the predictive analysis 139 engine to anticipate the efficacy of certain bulk communications to customers. The applications for adding programmatically collected or manually collected attributes are diverse and therefore a practitioner in customer service and contact center operations may contemplate other uses for such data.

At 3340, the second leg of an individualized transaction or finalization of a bulk communication is achieved. The system is now ready to process more transactions. It should be understood that the logic flow depicted in FIG. 3 may happen in parallel with a plurality of interactions across a plurality of target platforms.

Figure 4A:
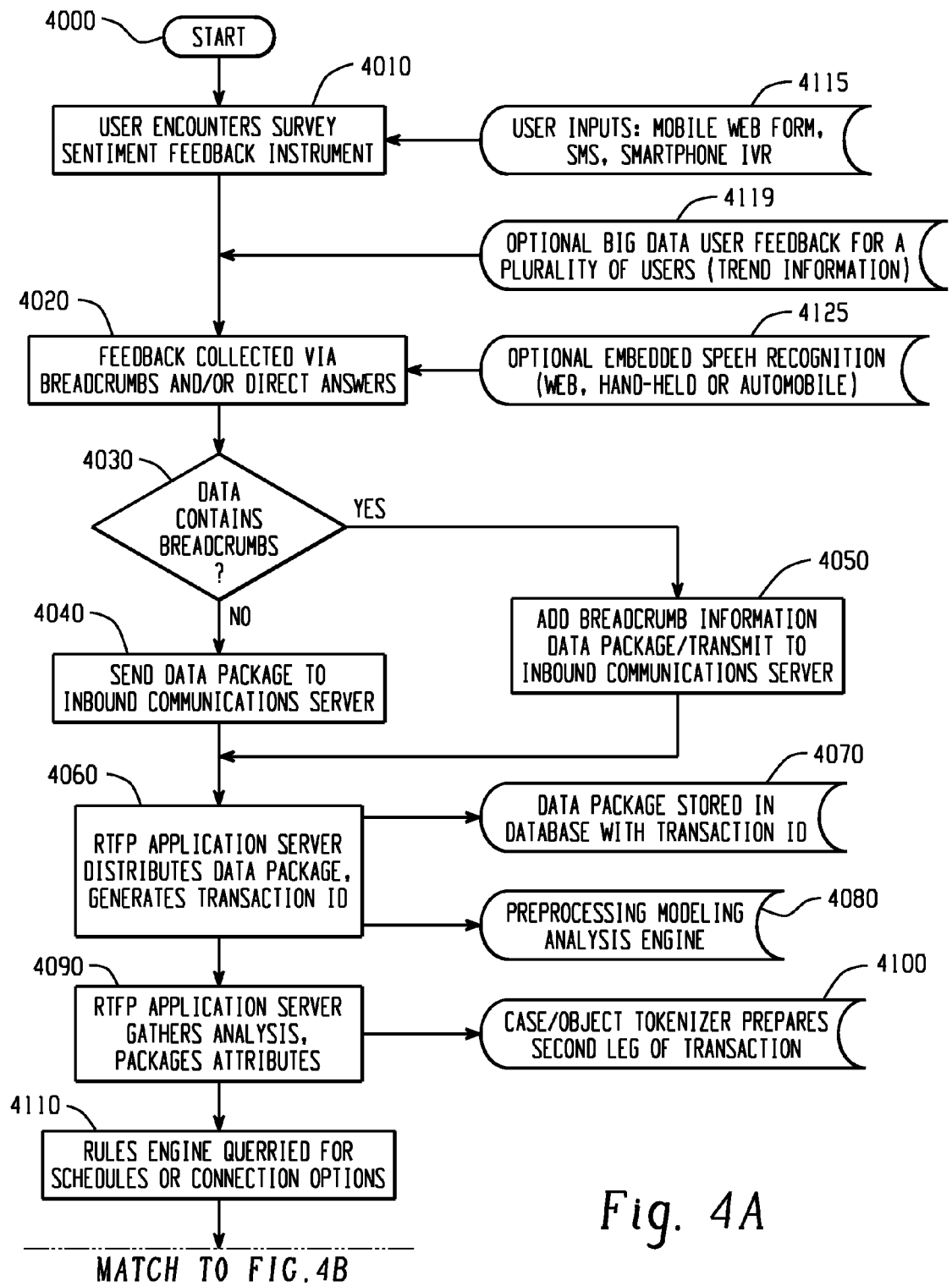
FIGS. 4A-4C are a flow chart illustrating an example of the overall logic flow for an individual or bulk communication initiated by a Web, Email, or Mobile-based customer interaction.
Figure 4B:
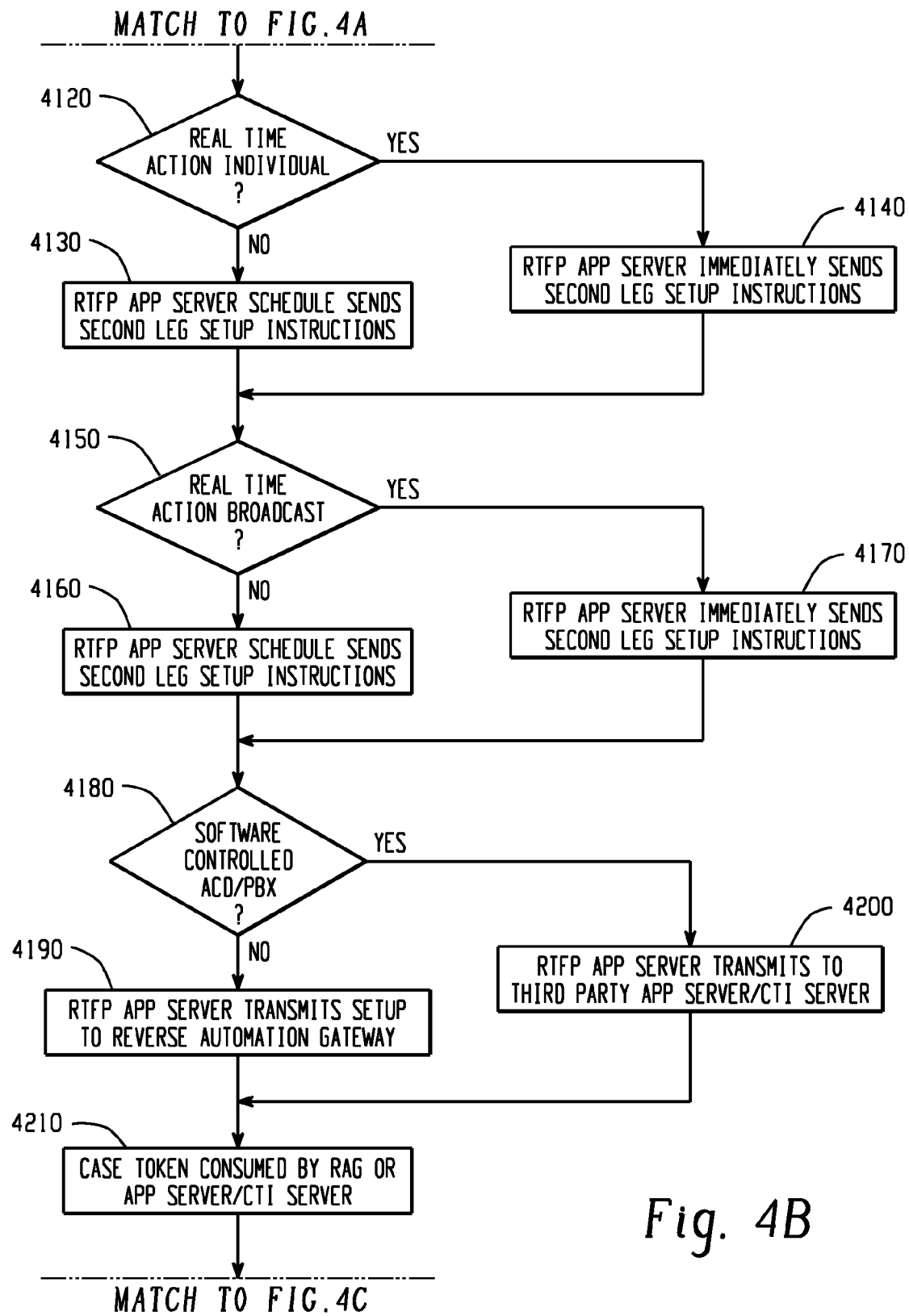
Figure 4C:
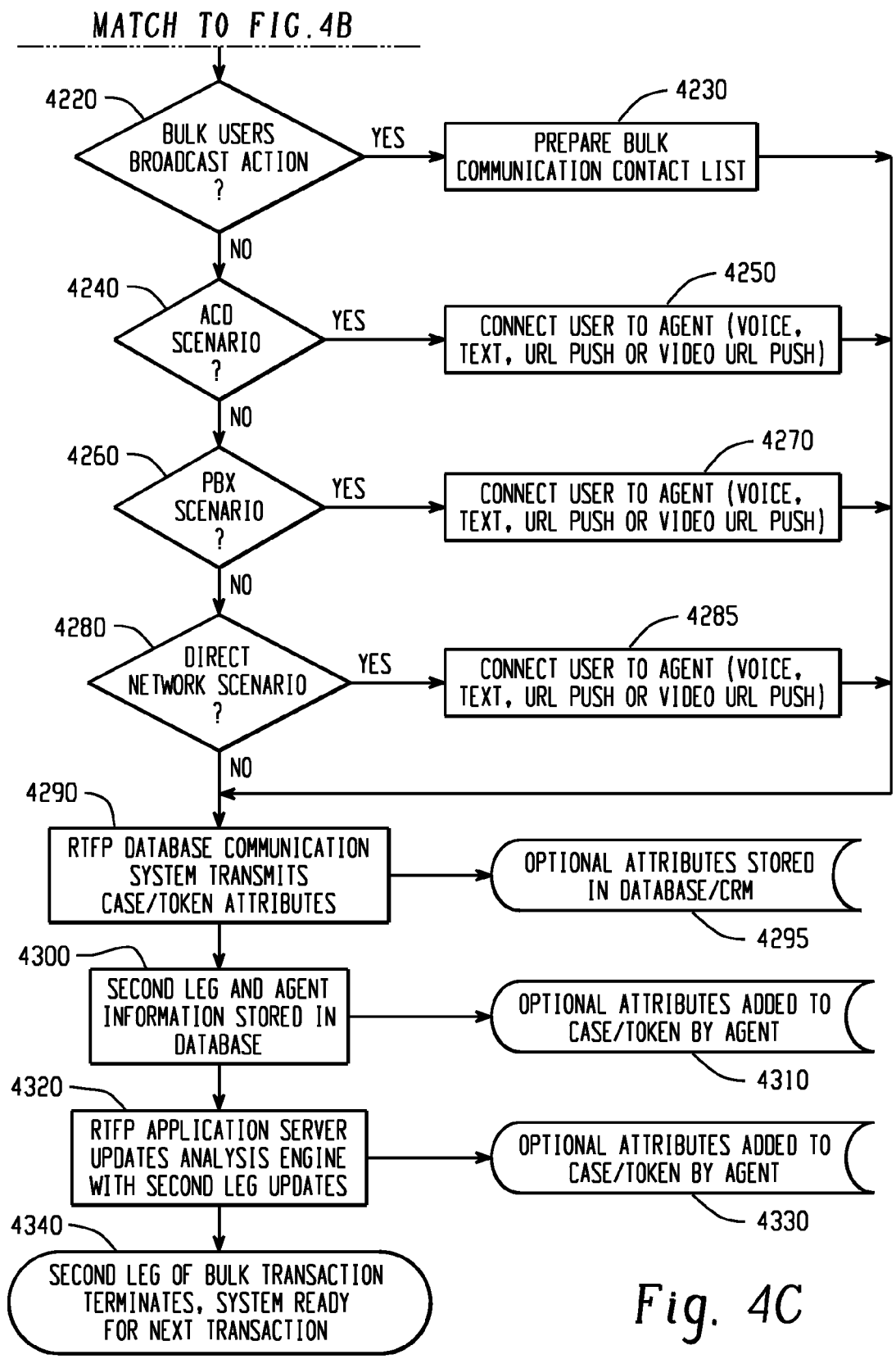

FIGS. 4A-4C include a flow chart illustrating an example of the logic flow for an individual or bulk communication initiated by a web, email or mobile-based customer interaction. Such interaction may be singular, with attention to one user, or it may pertain to a search of data pertaining to many users' collective feedback.

At 4000, the logic flow begins with particular attention in this scenario to a web-based or mobile-based scenario. At 4010, the user encounters one of several input modes with which sentiment and other feedback can be collected. Such feedback may be a response to a solicited question posed to the user or alternatively, the feedback may be an unsolicited question from the user. For solicited web-based input, this is typically manifest as a survey in which a knowledge base portion of a web site, or alternatively an e-commerce section of a web site would ask a series of questions allowing for a textual response from the user. In another example, the user feedback may come in the form of a verbatim quote—that is to say a free-form spoken recording of the user's words. This may be in the form of a recording supported by WebRTC or another voice over IP type of connection to the web site. Such a recording may be transformed into text using high-speed speech analytics algorithms. This transformation of speech to text may be useful in analyzing both solicited and unsolicited feedback from the user.

In another example, input may come in the form of a mobile web form—having been filled out by the user, or SMS (Short Message Service) text, or input from an in-car telemetry device, or options offered in a native Smartphone application as depicted at 4115.

In another example, input may come in the form of an email. Such emails may be collected by the 420 (web/email feedback collection instrument), as described above with reference to FIG. 1. Email communications standards, such as POP3 and IMAP, are routinely used to connect to and further download emails from email communications servers. In this manner the real time feedback proxy may incorporate the text from emails to establish customer sentiment and feedback.

In another example, such data may be collected from a plurality of web sites, social networks, or mobile devices, in order to gather sentiment and feedback from many people simultaneously as depicted at 4119. In this scenario, the inbound communications server/data collection 140 or the inbound telephony/media server 145 or may be used as data aggregation points in order to parse and transmit relevant data to the application server and memory/I/O 105.

Regardless of input modality (i.e., web form, email, free-form speech, smartphone application choices, SMS, in-car telemetry device, big data search, search of knowledge base data, etc.), the web or mobile device(s) may be used to collect and transmit data at 4020. At 4125, the data to be transmitted is identified as being text, speech, or datagram-oriented.

At 4030, the decision of whether the collected data will include breadcrumb data is determined. Breadcrumbs are digital footprints left behind by a user to indicate what page of a web site was visited or what part of a mobile application was used.

If breadcrumb data is not available, then the default information collected directly by user input or search criteria is transmitted to the inbound communications server/data collection 140, as depicted at 4040. If breadcrumb data is available, then this additional data is also transmitted to the inbound communications server/data collection 140, as depicted at 4050.

At 4060, the real time feedback proxy 100 processes the data collected by the inbound communications server/data collection 140 or the inbound telephony/media server 145. Here, the application server and memory/I/O 105 generates a unique interaction ID, as described above with reference to FIG. 2. This interaction ID and other information associated with the data collected is then stored in the database 110 at 4070. Text data associated with the same transaction is transmitted by the application server and memory/I/O 105 to the preprocessing engine 125, as depicted at 4080. Such transmission my also include a "copy" of the data to the other natural language processing elements of the real time feedback proxy 100 including the modeling engine 130 and the analysis engine 135. Such data may be processed either in parallel, or in serial by the natural language processing elements.

At 4090, the application server and memory/I/O 105 gathers from the analysis engine 135 all of the requisite output and characterizations of the text that was analyzed for a particular unique interaction ID. Such characterizations may, for example, include user sentiment, word cluster information, and trend analysis data.

At 4100, the application server and memory/I/O 105 takes the data from the previous step 4090 and packages it for consumption by the case/object tokenizer 120. Directly afterwards or alternately in parallel, the application server and memory/I/O 105 queries the rules engine 4110 for essential information dealing with actions to take on the interaction in question. Such actions may, for example, include: 1) immediate, real-time connection between a user and an agent; 2) scheduled, real-time connection between a user and an agent based on customer preference; 3) immediate broadcast of information to a single user via email or SMS or social networking channels; or 4) scheduled broadcast of information to a plurality of users via email or SMS or social networking channels.

An example of the varied decisions contemplated by the rules engine 115 is depicted at 4120. Here, for example, a determination of taking immediate action versus a scheduled communication is finalized for an individual user. If a scheduled transaction is called for affecting an individual user, then the application server and memory/I/O 105 packages the requisite commands so they can be made part of the token created by the case/object tokenizer 120, as depicted at 4130. If an immediate transaction is called for affecting an individual user, then the application server and memory/I/O 105 packages the requisite commands so they can be made part of the token created by the case/object tokenizer 120, as depicted at 4140.

At 4150, a determination of taking immediate action versus a scheduled communication is finalized for a bulk or broadcast type of communication affecting a plurality of users. If a scheduled transaction is called for affecting a plurality of users, then the application server and memory/I/O 105 packages the requisite commands so they can be made part of the token created by the case/object tokenizer 120, as depicted at 4160. If an immediate transaction is called for affecting a plurality of users, then the application server and memory/I/O 105 packages the requisite commands so they can be made part of the token created by the case/object tokenizer 120, as depicted at 4170.

At 4180, the application server and memory/I/O 105 makes a determination if the outbound communication will be targeted towards a software controlled ACD or PBX. If a reverse automation gateway or switching matrix is to be used, as depicted at 4190, such a communication is conveyed via the outbound telephony/media server 155. The outbound telephony/media server 155 then transmits the appropriate information to the reverse automation gateway or switching matrix 200. If a software controlled ACD or PBX is to be used, as depicted at 4200, such a communication is conveyed via the outbound telephony/media server 155. The outbound telephony/media server 155 then transmits the appropriate information to the application server or CTI server 300.

At 4210, the token generated by the case/object tokenizer 120 is consumed by the target platform (e.g., ACD, PBX, Reverse Automation Gateway, etc.) Such a token will have already been packaged to use the specific protocols of the target platform, as described above with reference to FIG. 2.

At 4220, the method determines if the preceding action taken included a broadcast message. If so, then a broadcast to a plurality of users is prepared at 4230, consistent with the list management, format, and protocol of the target platform. Any documents or lists may be generated by the application server and memory/I/O 105 or the case/object tokenizer 120 and packaged as required for the target platform. A variety of known APIs, flat files, and other methods are available for achieving this purpose. In the context of the real time feedback proxy 100, these APIs, flat files, and other methods are triggered by the token generated by the case/object tokenizer 120.

At 4240, if the communication was sent to an ACD, then the ACD connects the user to an agent, as depicted at 4250. Such a connection may be performed in real time using telephony, or alternately may be started with a URL (Uniform Resource Locator) "push" to the user. For example, the ACD may send a user-to-agent chat link to the user via a URL push or alternately may send a user-to-agent callback link to the user via a URL push.

At 4260, if the communication was sent to a PBX, then the PBX connects the user to an agent, as depicted at 4270. Such a connection may be performed in real time using telephony, or alternately may be started with a URL (Uniform Resource Locator) "push" to the user. For example, the PBX may send a user-to-agent chat link to the user via a URL push or alternately may send a user-to-agent callback link to the user via a URL push.

It is instructive to note that the use of a reverse automation gateway or switching matrix 200 may also be used to connect the real time feedback proxy 100 to users. In this case, the token generated by the case/object tokenizer 120 is consumed by the reverse automation gateway or switching matrix 200] and used as an automated script that emulates the input of a user and on behalf of a user encountering a PBX or an ACD that has some form of IVR input required.

A direct network connection may be achieved without the benefit or use of an ACD or PBX, as depicted at 4280. In this scenario, the application server and memory/I/O 105 communicates directly to a public or private network and uses its own agent availability and coordinates information to connect users with agents. The application server and memory/I/O 105 may construct its own scripts, lists, API commands or protocols to initiate bulk communications to a plurality of users.

At 4290, the real time feedback proxy 100 may additionally transmit subsequent user data to the target platform. For example, additional attributes related to an existing token with an existing interaction ID may be collected during an existing transaction. Such data may be subsequently transmitted in order to benefit the agent in processing the transaction more efficiently. For example, such subsequent attribute information may include a change in sentiment (either good or bad) that may in turn trigger the rules engine 115 to escalate said interaction. It should be understood that other information may also be transmitted. For example, additional information on the influence or buying power of a user may be transmitted after the connection has been made. At 4295, such data is stored in the database 110, or alternately in a CRM (Customer Relationship Management) system in order to enhance the records kept on behalf of the user or users in question.

Data relative to agent actions may be stored at 4300. At 4310, additional attributes are contemplated that may be collected manually by the agent and stored alongside information that was collected automatically.

At 4320, the real time feedback proxy 100 may take data collected after connection to an agent or broadcast and feed it back to the natural language processing elements including the modeling engine 130 and the analysis engine 135 in order to perfect the accuracy of trend analysis or other algorithms explained above. As depicted at 4330, additional attributes associated with a specific interaction ID and token may also be stored, such as manual data collected by the agent. For example, an agent may wish to indicate that a user's sentiment or level of satisfaction substantially changed at the end of a transaction. This type of data may be used by the predictive analysis 139 engine to anticipate the efficacy of certain bulk communications to customers. The applications for adding programmatically collected or manually collected attributes are diverse and therefore a practitioner in customer service and contact center operations may contemplate other uses for such data.

At 4340, the second leg of an individualized transaction or finalization of a bulk communication is achieved. The system is now ready to process more transactions. It should be understood that the logic flow depicted in FIG. 4 may occur in parallel with a plurality of interactions across a plurality of target platforms.

Figure 5A:
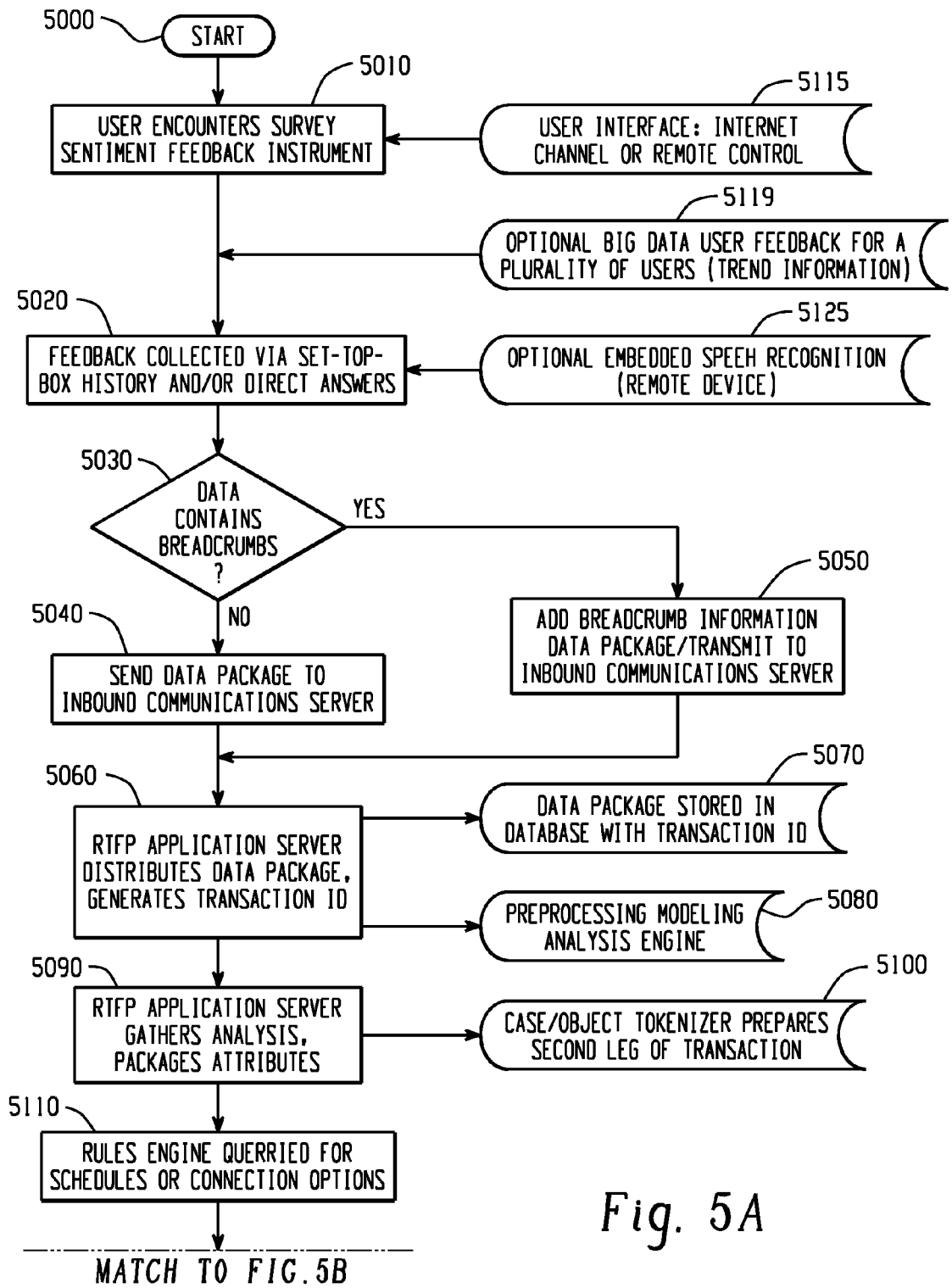
FIGS. 5A-5C are a flow chart illustrating an example of the overall logic flow for an individual or bulk communication initiated by a Television or Video-based customer interaction.
Figure 5B:
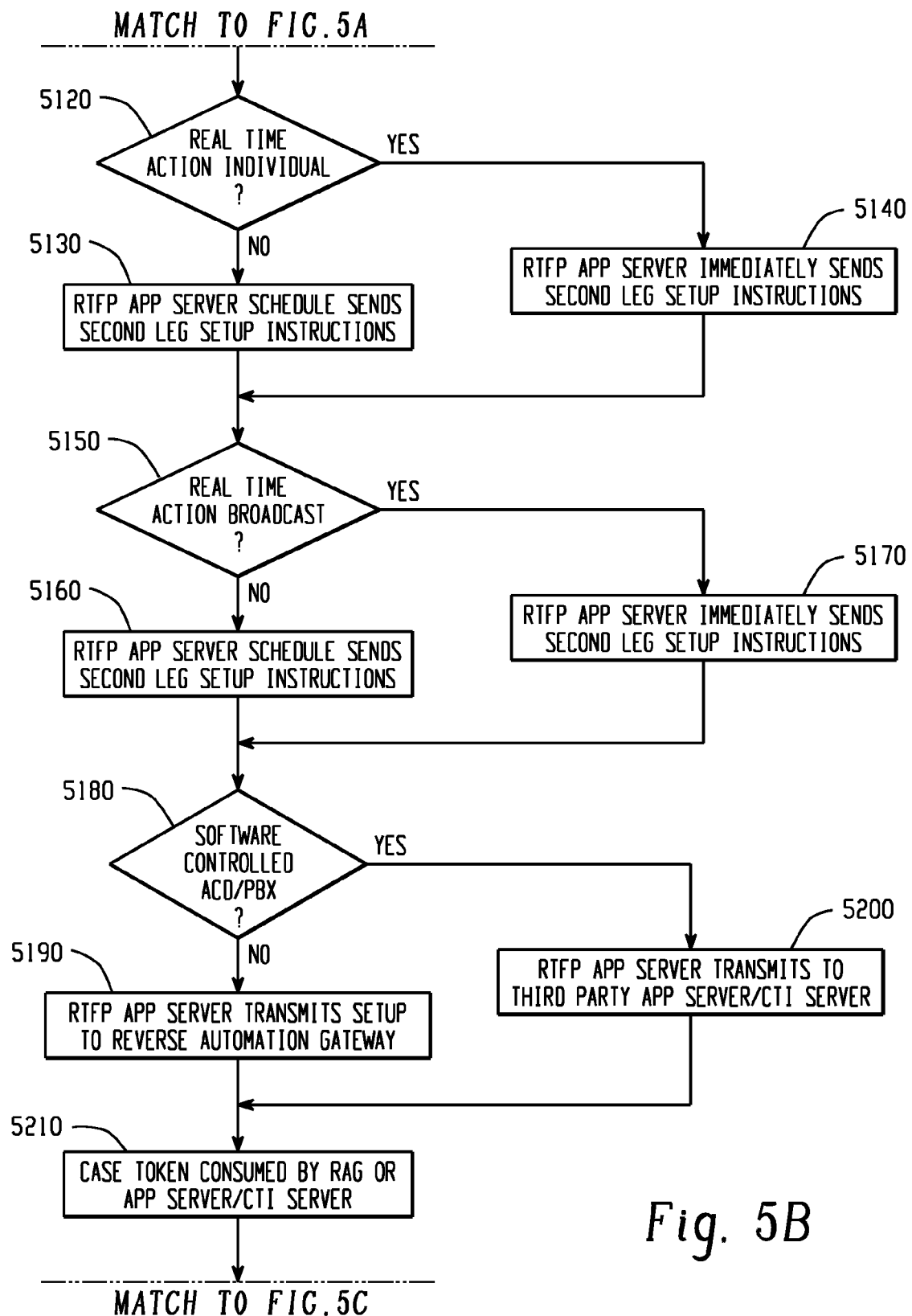
Figure 5C:
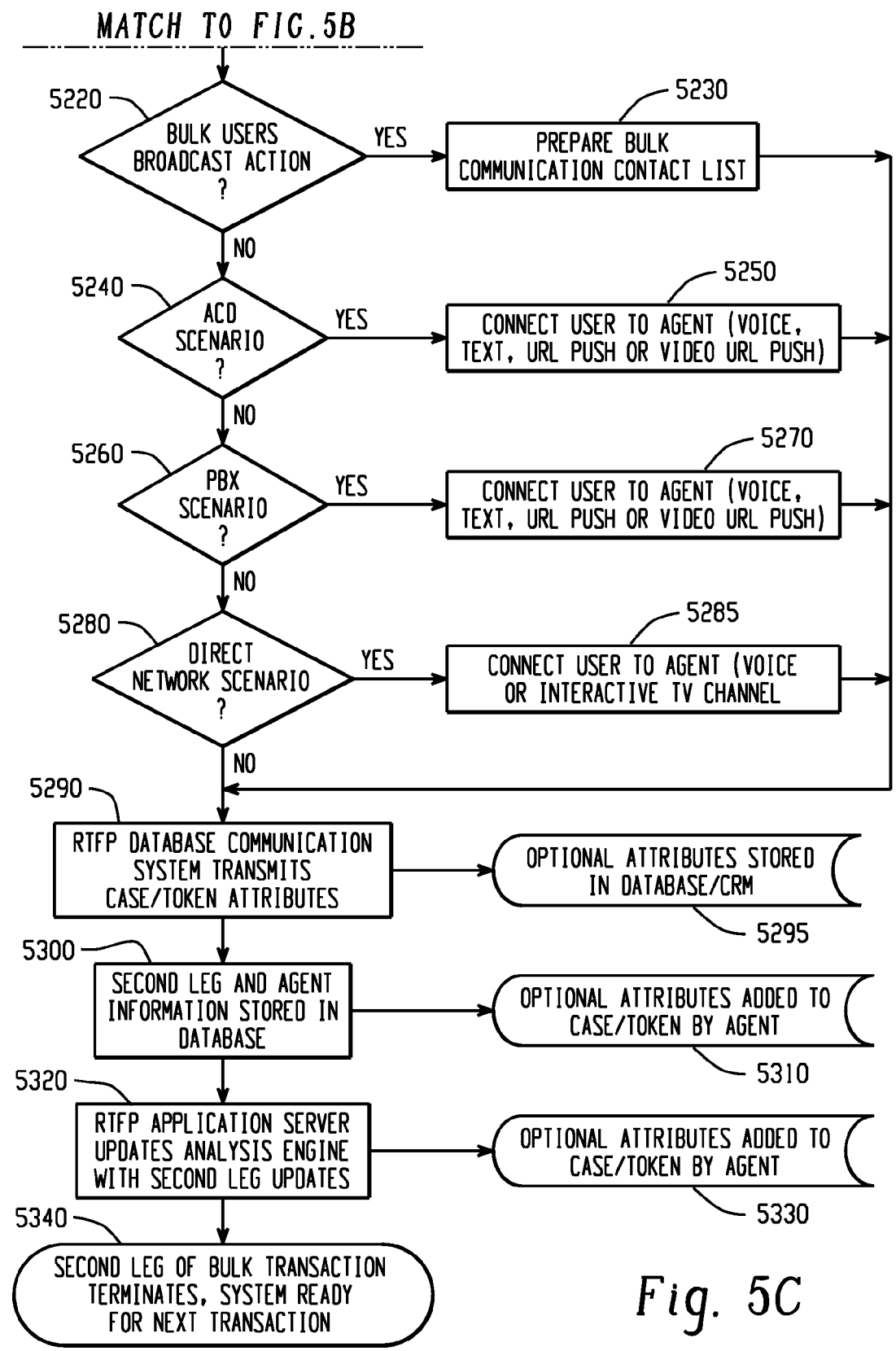

FIGS. 5A-5C include a flow chart illustrating an example of the logic flow for an individual or bulk communication initiated by a Television or Video-based customer interaction. Such interaction may be singular, with attention to one user, or it may pertain to a search of data pertaining to many users' collective feedback.

At 5000, the logic flow begins with particular attention in this scenario to a television or set-top-based scenario. Such a television or set-top device scenario may involve traditional television transmission or may use cable-based, or IP/TV based transmission.

At 5010, the user encounters one of several input modes with which sentiment and other feedback can be collected. Such feedback may be a response to a solicited question posed to the user or alternately, the feedback may be an unsolicited question from the user. For example, feedback from an interactive TV program may include votes cast for a particular broadcast such as votes for a singer on "America's Got Talent." The types of solicitations and under what circumstances are varied. This may also include, for example, commerce applications such as TV-based ordering of goods or services.

For interactive TV-based input, a series of questions may be solicited from the user allowing for a textual response from the user. The user feedback may come in the form of a verbatim quote, i.e., a free-form spoken recording of the user's words. This may require the TV or the set-top box to be equipped with a voice channel to capture spoken words as a recording. Such a recording may be transformed into text using high-speed speech analytics algorithms. This transformation of speech to text may be useful in analyzing both solicited and unsolicited feedback from the user.

Input may come in the form of a web form presented as part of an "Internet Channel" or input from programmable buttons on a remote control device that is connected to the TV or set-top box, as depicted at 5115.

In another example, such data may be collected from a plurality of television sets or set-top Bboxes in order to gather sentiment and feedback from many people simultaneously, as depicted at 5119. In this scenario, the inbound communications server/data collection module 140 or the inbound telephony/media server 145 may be used as data aggregation points in order to parse and transmit relevant data to the application server and memory/I/O 105.

Regardless of input modality (i.e., interactive TV programs, free-form speech, remote control programmable button choices, big data search, search of knowledge base data, etc.), the television or set-top box devices will be used to collect and transmit data, at shown at 5020. At 5125, the data to be transmitted is identified as being text, speech, or datagram-oriented.

At 5030, the decision of whether the collected data will include breadcrumb data is determined. Breadcrumbs are digital footprints left behind by a user to indicate what page of a web site was visited or what part of a mobile application was used. Similarly, an interactive TV program or set-top box may be programmed to store and remember what channels and programs were visited by the user and for how long.

If breadcrumb data is not available, the default information collected directly by user input or search criteria is transmitted to the inbound communications server/data collection module 140, as depicted at 5040. If breadcrumb data is available, then this additional data is also transmitted to the inbound communications server/data collection module 140, as depicted at 5050.

At 5060, the real time feedback proxy 100 processes the data collected by the inbound communications server/data collection 140 or the inbound telephony/media server 145. Here, the application server and memory/I/O 105 generates a unique interaction ID, as described above with reference to FIG. 2. The interaction ID and other information associated with the data collected is stored in the database 110, as depicted at 5070. In addition, text data associated with the same transaction is transmitted by the application server and memory/I/O 105 to the preprocessing engine 125, as depicted at 5080. Such transmission my also include a "copy" of the data to the other natural language processing elements of the real time feedback proxy 100 including the modeling engine 130 and the analysis engine 135. Such data may be processed either in parallel, or in serial by the natural language processing elements.

At 5090, the application server and memory/I/O 105 gathers from the analysis engine 135 all of the requisite output and characterizations of the text that was analyzed for a particular unique interaction ID. Such characterizations may, for example, include user sentiment, word cluster information, and trend analysis data.

At 5100, the application server and memory/I/O 105 takes the data from the previous step S090 and packages it for consumption by the case/object tokenizer 120. Directly afterwards or alternately in parallel, the application server and memory/I/O 105 queries the rules engine 5110 for essential information dealing with actions to take on the interaction in question. Such actions may, for example, include: 1) immediate, real-time connection between a user and an agent (In a TV scenario, the user may be reached on a telephone—having provided a telephone number as part of the feedback collection step 5020. Alternately, the user may be connected via VoIP (Voice Over IP) directly via the TV broadcast channel or similar channel.); 2) scheduled, real-time connection between a user and an agent based on customer preference; 3) immediate broadcast of information to a single user via TV broadcast (that is single-cast only to one subscriber), email or SMS or social networking channels; or 4) scheduled broadcast of information to a plurality of users via TV broadcast, email or SMS or social networking channels.

An example of the varied decisions contemplated by the rules engine 115 are depicted at 5120. Here, for example, a determination of taking immediate action versus a scheduled communication is finalized for an individual user. If a scheduled transaction is called for affecting an individual user, then the application server and memory/I/O 105 packages the requisite commands so they can be made part of the token created by the case/object tokenizer 120, as depicted at 5130. If an immediate transaction is called for affecting an individual user, then the application server and memory/I/O 105 packages the requisite commands so they can be made part of the token created by the case/object tokenizer 120, as depicted at 5140.

At 5150, a determination of taking immediate action versus a scheduled communication is finalized for a bulk or broadcast type of communication affecting a plurality of users. If a scheduled transaction is called for affecting a plurality of users, then the application server and memory/I/O 105 packages the requisite commands so they can be made part of the token created by the case/object tokenizer 120, as depicted at 5160. If an immediate transaction is called for affecting a plurality of users, then the application server and memory/I/O 105 packages the requisite commands so they can be made part of the token created by the case/object tokenizer 120, as depicted at 5170.

At 5180, the application server and memory/I/O 105 determines if the outbound communication will be targeted towards a software controlled ACD or PBX. If a reverse automation gateway or switching matrix are to be used, as depicted at 5190, such a communication may be conveyed via the outbound telephony/media server 155. The outbound telephony/media server 155 then transmits the appropriate information to the reverse automation gateway or switching matrix 200. If a software controlled ACD or PBX are to be used, as depicted at 5200, such a communication is conveyed via the outbound telephony/media server 155. The outbound telephony/media server 155 then transmits the appropriate information to the application server or CTI server 300. In this scenario, a PSTN (Public Switched Telephone Network) to VoIP (Voice Over Internet Protocol) gateway may be employed to convert telephone signals for the proper protocol between the reverse automation gateway or switching matrix 200 and the telecommunications interface of the target TV or set-top box or video channel connected to the user. Otherwise, the telephonic connection may be made over traditional channels as shown in steps 5020 and 5100.

At 5210, the token generated by the case/object tokenizer 120 is consumed by the target platform (e.g., ACD, PBX, Reverse Automation Gateway, etc.) Such a token will have already been packaged to use the specific protocols of the target platform, as described above with reference to FIG. 2.

At 5520, the method determines if the preceding action includes a broadcast message. If so, then a broadcast to a plurality of users is prepared at 5230, consistent with the list management, format, and protocol of the target platform. Any documents or lists are generated by the application server and memory/I/O 105 or the case/object tokenizer 120 and packaged as required for the target platform. There are a variety of APIs, flat files, and other methods well known to contact center practitioners for achieving this purpose. In the context of the real time feedback proxy 100, these APIs, flat files, and other methods will be triggered by the token generated by the case/object tokenizer 120.

At 5240, if the communication was sent to an ACD, then the ACD connects the user to an agent, as depicted at 5250. Such a connection may be performed in real time using telephony, or alternately may be started with a URL (Uniform Resource Locator) "push" to the user. For example, the ACD may send a user-to-agent chat link to the user via a URL push or alternately may send a user-to-agent callback link to the user via a URL push. In one example, such connections or push URLs will be transmitted to the TV or set-top box and controlled via a remote control device or voice commands. In another example, such connections may be performed outside of the traditional TV broadcast channel on a smartphone or regular phone or computer.

At 5260, if the communication was sent to a PBX, then the PBX will connect the user to an agent as depicted at 5270. Such a connection may be performed in real time using telephony, or alternately may be started with a URL (Uniform Resource Locator) "push" to the user. For example, the PBX may send a user-to-agent chat link to the user via a URL push or alternately may send a user-to-agent callback link to the user via a URL push. In one example, such connections or push URLs will be transmitted to the TV or set-top box and controlled via a remote control device or voice commands. In another example, such connections may be performed outside of the traditional TV broadcast channel on a smartphone or regular phone or computer.

It is instructive to contemplate that the use of a reverse automation gateway or switching matrix 200 may also be used to connect the real time feedback proxy 100 to users. In this case the token generated by the case/object tokenizer 120 may be consumed by the reverse automation gateway or switching matrix 200 and used as an automated script that emulates the input of a user and on behalf of a user encountering a PBX or an ACD that has some form of IVR input required.

In addition, a direct network connection may be achieved without the benefit or use of an ACD or PBX, as depicted at step S280. In this scenario, the application server and memory/I/O 105 communicates directly to a public or private network and use its own agent availability and coordinate information to connect users with agents. The application server and memory/I/O 105 may construct its own scripts, lists, API commands or protocols to initiate bulk communications to a plurality of users.

At 5290, the real time feedback proxy 100 may additionally transmit subsequent user data to the target platform. For example, additional attributes related to an existing token with an existing interaction ID may be collected during an existing transaction. Such data may be subsequently transmitted in order to benefit the agent in processing the transaction more efficiently. For example, such subsequent attribute information may include a change in sentiment (either good or bad) that may in turn trigger the rules engine 115 to escalate said interaction. It should be understood that other information may also be transmitted. For example, additional information on the influence or buying power of a user may be transmitted after the connection has been made. At 5295, such data may be stored in the database 110, or alternately in a CRM (Customer Relationship Management) system in order to enhance the records kept on behalf of the user or users in question.

In addition, data relative to agent actions may be stored as depicted at 5300. At 5310, additional attributes are contemplated that may be collected manually by the agent and stored alongside information that was collected automatically.

At 5320, the real time feedback proxy 100 may take data collected after connection to an agent or broadcast and feed it back to the natural language processing elements including the modeling engine 130 and the analysis engine 135 in order to perfect the accuracy of trend analysis or other algorithms explained above. At 5330, additional attributes associated with a specific interaction ID and token may also be stored, such as manual data collected by the agent.

For example, an agent may wish to indicate that a user's sentiment or level of satisfaction substantially changed at the end of a transaction. This type of data may be used by the predictive analysis 139 engine to anticipate the efficacy of certain bulk communications to customers. The applications for adding programmatically collected or manually collected attributes are diverse and therefore a practitioner in customer service and contact center operations may contemplate other uses for such data.

At 5340, the second leg of an individualized transaction or finalization of a bulk communication is achieved. The system is now ready to process more transactions. It should be understood that the logic flow depicted in FIG. 5 may occur in parallel with a plurality of interactions across a plurality of target platforms.

This written description uses examples to disclose the invention, including the best mode, and also to enable a person skilled in the art to make and use the invention. The patentable scope of the invention may include other examples that occur to those skilled in the art.

The systems and methods described herein may provide certain non-limiting advantages. For example, the system and methods described herein may provide the capability to automatically process and take real time action on "voice-of-the-customer" data including customer survey feedback, sentiment feedback, enterprise-affecting trend data, customer behavior data and customer experience data is contemplated.

As another example, the systems and methods described herein may enable the orchestration of disparate systems and data in order to collect, interpret, store data, and trigger appropriate actions. A centralized overlay proxy called the real time feedback proxy may collect voice-of-the-customer data from a plurality of collection points, such as web, chat, SMS, email, social networking, mobile, video, television or telephonic. These various data may then be interpreted using real-time text-based NLP (Natural Language Processing) engines, including a preprocessing engine, a modeling engine and an analysis Engine.

In another example, the real time feedback proxy may provide the analysis of voice-of-the-customer data to a rules engine (i.e., decisioning engine) in order to match certain analyzed data with triggers that are stored in a database. The rules engine is the method by which certain conditions are set to determine the actionability of these conditions supported by the analyzed data.

In another example, the real time feedback proxy may employ a case/object tokenizer. The resulting tokens are further associated with a unique interaction ID, so downstream systems and processes may be synchronized. These tokens may be used to create enterprise-specific scripts that can be handed-off to a plurality of contact center systems. These contact center systems may include ACD, PBX, direct network connections, email broadcast systems, SMS broadcast systems, social engagement for customer care systems, television broadcast, video, in-car telemetry systems, web site or knowledge base systems and mobile devices. These case/object tokenized scripts may in turn be consumed by the contact center systems to facilitate both individualized or bulk communications. Such communications may be scheduled or delayed, or they may be facilitated in real time. Such case/object tokenized scripts may be achieved in a variety of ways including, but not limited to, application programming interfaces (API) such as REST-based or web services methods, proprietary data streams, touch-tone commands, speech commands, or any other method employed by enterprise CTI servers, ACDs, PBXs, IVRs, in customary means of interfacing with these systems.

In another example, the case/object tokenized scripts generated by the real time feedback proxy may also include instructions to quality monitoring systems. Such quality monitoring systems are used to gauge the efficacy and adherence to policy of agents. In this regard, the feedback and sentiment of a customer before, during and/or after a communication may be gauged by the real time feedback proxy. Such a quality monitoring system may be therefore automatically updated with the progression of sentiment or feedback during said transaction. This may provide a more rich understanding of how the agent was successful or unsuccessful in improving the customer's sentiment during a communication. Such information would be invaluable to supervisors in onboarding and coaching agents.

Another potential advantage of the systems and methods described herein is the ability of the real time feedback proxy to use its own, built-in contact center infrastructure in the form of native switching and delivery systems. Such native systems, including, for example, a software-controlled reverse automation gateway or switching matrix, enables the real time feedback proxy to act as a robotic stand-in on behalf of customers. Such communications may be scheduled or delayed, or they may be facilitated in real time. The real time feedback proxy can be programmed to navigate third-party contact center systems by emulating the input of a "live" customer in order to eliminate the need for systems integration with target enterprise contact center infrastructure.

The real time feedback proxy may also employ its own media server function that can be used to broadcast mass communications via email, chat, SMS, smartphone, social network, TV, video or in-car telemetry.

The real time feedback proxy may be located in a telephone company network, or situated as a software-as-a-service offering in a data center, such that it may be used as a shared device on behalf of a plurality of enterprises. It may also be deployed as a dedicated system situated on premises at a particular enterprise physical site.

In another example, the real time feedback proxy may also send additional instructions to an ACD, PBX or direct network connection to determine certain thresholds for the escalation of certain customer communications that may require the intervention of a specialist or supervisor instead of a "regular" customer service agent. For example, a customer sentiment threshold could be set at 70% satisfaction. If the enterprise's goals are to achieve above 70% satisfaction, any sentiment or feedback indicating a score less than 70% will generate a case or token that would be used to create a real time connection between the customer and a supervisor. In addition, such a connection may be preceded by a message to the customer expressing the company's desire to achieve better satisfaction and to "wait one moment while we connect you to a supervisor."

It is claimed:

1. A communications proxy and overlay network system for a plurality of customer feedback collection instruments that are configured to gather information from customers, comprising:
   a communications server array configured to communicate with a user device and one or more contact centers, the communications server array including,
      a first network signaling interface configured to communicate over a first type of telecommunications network, and
      a second network signaling interface configured to communicate over a second type of telecommunications network;
   an application server configured to communicate with i) the communications server array, ii) a first contact center with an associated first user interface, and iii) a second contact center with an associated second user interface,
      wherein the application server is configured to store and transmit a first unique interaction ID and token for interacting with the first contact center, and a second unique interaction ID and token for interacting with the second contact center, and
      wherein the application server is further configured to assemble and transmit the first unique interaction ID and token based on an input associated with the user device to generate an output for interacting with the first contact center using the first user interface; and an intelligent text processing and analysis module configured to transform an input from the user device to a modified input for use by the first contact center and second contact center to facilitate real time or delayed communications between users and agents.

2. The system of claim 1, wherein the communications server array is configured to gather sentiment, questions, feedback and other customer data from a plurality of users via news feeds, social networks or knowledge bases.

3. The system of claim 1, wherein the communications server array is receptive to outputs from the first user interface and is configured to generate a corresponding response to be transmitted to the first contact center.

4. The system of claim 3, wherein the response transmitted to the first contact center is in a predetermined format particular to the first contact center to facilitate a connection to an agent.

5. The system of claim 3, wherein the response is transmitted to the first contact center in real-time.

6. The system of claim 3, wherein the response is transmitted to the first contact center in non-real-time.

7. The system of claim 1, wherein the communications server array is receptive to outputs from the first user interface and is configured to generate a corresponding response to be transmitted to a direct network connection.

8. The system of claim 7, wherein the response transmitted to the direct network connection is in a predetermined format particular to the direct network connection to facilitate a connection to an agent.

9. The system of claim 7, wherein the response is transmitted to the direct network connection in real-time.

10. The system of claim 7, wherein the response is transmitted to the direct network connection in non real-time.

11. The system of claim 1, wherein the communications server array is receptive to outputs from the first contact center and is configured to generate a corresponding response to be transmitted to the user device.

12. The system of claim 1, wherein the communication server array is configured to communicate with the one or more contact centers over a public network.

13. The system of claim 1, wherein the communication server array is configured to communicate with the one or more contact centers over a private network.

14. The system of claim 1, further comprising:
a profile stored in a database and associated with a user, the profile including sentiment and/or feedback data;
wherein the first interaction unique ID and token is at least partially regulated by one or more configuration attributes.

15. The system of claim 14,
wherein a first one of the configuration attributes is selected from a group consisting of an account identifier, contact identifiers, a user device identifier, and an external account identifier; and
wherein a second one of the configuration attributes defines an extent to which the first one of the configuration attributes is transmitted to the first contact center.

16. The system of claim 1, further comprising:
an aggregated profile stored in a database and associated with a plurality of users, the profile including sentiment and feedback data;
wherein the first interaction unique ID and token is at least partially regulated by one or more configuration attributes.

17. The system of claim 1, wherein the communication server array is configured to emulate the functions of an ACD or PBX.

18. The system of claim 1, further comprising:
an administrative user interface configured for use by an administrator to configure and modify one or more of i) user information; ii) agent information; iii) business rules and rules trigger information; iv) unique ID and token configuration information for each ACD, PBX or direct network connection; v) natural language processing training data; vi) trend information; vii) distribution list curation; viii) document management; news feed configuration; ix) social network data feed configuration; x) public network connection information, xi) private network connection information, xii) communications server array configuration data; xiii) database connection information; xiv) CRM system connection information; and xv) scheduling information.

19. The system of claim 1, further comprising:
a business rules module coupled to the communications server array, wherein the business rules module governs the timing of transmission of the first unique interaction ID and token to the first contact center or direct network connection.

20. The system of claim 19, further comprising:
a trend analysis module coupled to the application server, the trend analysis module configured to provide the business rules module with data to programmatically schedule real time connections between users and agents;
wherein the business rules module is configured to
schedule delayed connections between users and agents,
schedule bulk communications to a plurality of users in real time, and
schedule delayed bulk communications to a plurality of users.

21. The system of claim 1, further comprising:
a document creation and list generation module coupled to the communications server array, wherein the application server controls an instruction for mass communication using the first unique interaction ID and token to the first contact center or direct network connection.

22. The system of claim 1, further comprising:
a database in communication with the application server and the communication server array, wherein data associated with the first unique interaction ID and token and data associated with the user are stored in the database.

23. The system of claim 1, wherein the communications server array is configured to communicate with the user device over a network selected from a group consisting of: a mobile telephone switch office network (MTSO), a public switched telephone network (PSTN), an Internet Protocol network (IP), a cable television network, an IP television network, a satellite network, and a multimedia network.

24. The system of claim 1, wherein the user device is selected from a group consisting of: a web browser, a smart phone, a telephone, a Voice over IP-based telephone, and a Set-Top Box for use with television and video devices.

25. The system of claim 1, wherein the first contact center is selected from a group consisting of: a business website and a social networking website.

26. The system of claim 1, wherein the communications server array includes a communication plugin that defines communications protocols
for use by the user device to communicate with a feedback collection instrument;
for use by the application server to configure a unique interaction ID and token to communicate with a contact center; and for use by the application server to configure a unique interaction ID and token to communicate with a direct network connection.

27. The system of claim 1, wherein the application server is configured to process real-time changes in sentiment or feedback whilst a connection between and user and an agent has already been established for the purpose of changing, re-routing, or otherwise escalating a communication based on triggers stored by a business rules module.

28. The system of claim 27,
   wherein changes in sentiment or feedback are collected in real time from the user and associated user device and subsequently transmitted to the application server for processing; and
   wherein the changes in sentiment or feedback are noted by the agent and transmitted by the application server to an intelligent text processing and analysis engine for (i) updates to trend information and for (ii) providing optimization for natural language processing accuracy.

29. The system of claim 27, wherein the sentiment or feedback of a customer represent specific levels of customer satisfaction; each level capable of triggering a specific and unique escalation path to initiate a real time communication with a specialist, supervisor, or alternate routine.

30. The system of claim 27, wherein a progression or change of sentiment or feedback of a customer before, during or after a real time communication with an agent is used to update a quality monitoring system based on triggers or tokens automatically provided to a quality monitoring system.

* * * * *